United States Patent
Siu et al.

(10) Patent No.: US 9,020,505 B2
(45) Date of Patent: Apr. 28, 2015

(54) QUICK SYSTEM SELECTION AND ACQUISITION FOR MULTI-MODE MOBILE DEVICES

(75) Inventors: Isaac Ta-yan Siu, San Diego, CA (US); Guangming Carl Shi, San Diego, CA (US); Nitin Pant, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1296 days.

(21) Appl. No.: 12/211,857

(22) Filed: Sep. 17, 2008

(65) Prior Publication Data

US 2010/0067434 A1    Mar. 18, 2010

(51) Int. Cl.
*H04W 4/00* (2009.01)
*H04W 48/18* (2009.01)
*H04W 48/08* (2009.01)
*H04W 88/06* (2009.01)

(52) U.S. Cl.
CPC .............. *H04W 48/18* (2013.01); *H04W 48/08* (2013.01); *H04W 88/06* (2013.01); *Y02B 60/50* (2013.01)

(58) Field of Classification Search
CPC . H04W 52/02; H04W 52/0203; H04W 88/06; H04W 88/10; H04W 72/04; H04W 76/00; H04W 80/04; H04W 36/14; H04W 36/16; H04W 36/18; H04W 36/20; H04W 36/22; H04W 36/24; H04W 36/30; H04W 36/34; H04W 36/36; H04W 36/38
USPC .......... 370/310, 311, 328, 329, 331; 455/403, 455/422.1, 426.1, 434, 73, 550.1, 552.1, 455/435.1, 435.2
See application file for complete search history.

(56) References Cited

U.S. PATENT DOCUMENTS

| 6,748,246 B1 * | 6/2004 | Khullar .......................... 455/574 |
| 7,653,037 B2 * | 1/2010 | Prakash et al. ................ 370/338 |
| 7,761,087 B2 * | 7/2010 | Kharia et al. .............. 455/414.1 |
| 7,848,784 B2 * | 12/2010 | Roh et al. ....................... 455/574 |

(Continued)

FOREIGN PATENT DOCUMENTS

| CN | 101002488 A | 7/2007 |
| EP | 1480483 A2 | 11/2004 |

(Continued)

OTHER PUBLICATIONS

International Search Report & Written Opinion—PCT/US2009/056760, International Search Authority—European Patent Office—Jan. 14, 2010.

(Continued)

*Primary Examiner* — Chi H Pham
*Assistant Examiner* — Weibin Huang
(74) *Attorney, Agent, or Firm* — Tyler J. Overall

(57) ABSTRACT

Methods and apparatus for using network topology and coverage information from one radio access technology (RAT) network to assist acquisition of another different RAT network for a multi-mode mobile station (MS), such as acquiring a WiMAX (Worldwide Interoperability for Microwave Access) network based on topology and coverage information about a 3G (Third Generation) network and vice versa, are provided. Base station (BS) acquisition assisted in this manner may provide for quick restoration of a previously interrupted or deactivated network service, while decreasing the power consumption of the multi-mode MS during a power savings state because periodic scanning and registration need not occur.

29 Claims, 19 Drawing Sheets

(56) References Cited

U.S. PATENT DOCUMENTS

| | | |
|---|---|---|
| 2006/0240840 A1* | 10/2006 | Morgan et al. ............ 455/456.1 |
| 2007/0070935 A1 | 3/2007 | Prakash et al. |
| 2007/0161401 A1* | 7/2007 | Sheynblat ................. 455/553.1 |
| 2009/0104907 A1* | 4/2009 | Otting et al. ............... 455/435.3 |
| 2010/0062800 A1* | 3/2010 | Gupta et al. .............. 455/552.1 |

FOREIGN PATENT DOCUMENTS

| | | |
|---|---|---|
| JP | 2005117269 A | 4/2005 |
| JP | 2006217178 A | 8/2006 |
| JP | 2007043578 A | 2/2007 |
| JP | 2008182507 A | 8/2008 |
| JP | 4944118 | 3/2012 |
| JP | 5001301 | 5/2012 |
| KR | 20080054420 | 6/2008 |
| WO | WO2007038781 A1 | 4/2007 |
| WO | 2007081395 A1 | 7/2007 |
| WO | WO 2007081395 A1 * | 7/2007 |

OTHER PUBLICATIONS

Taiwan Search Report—TW098131115—TIPO—Mar. 21, 2013.

* cited by examiner

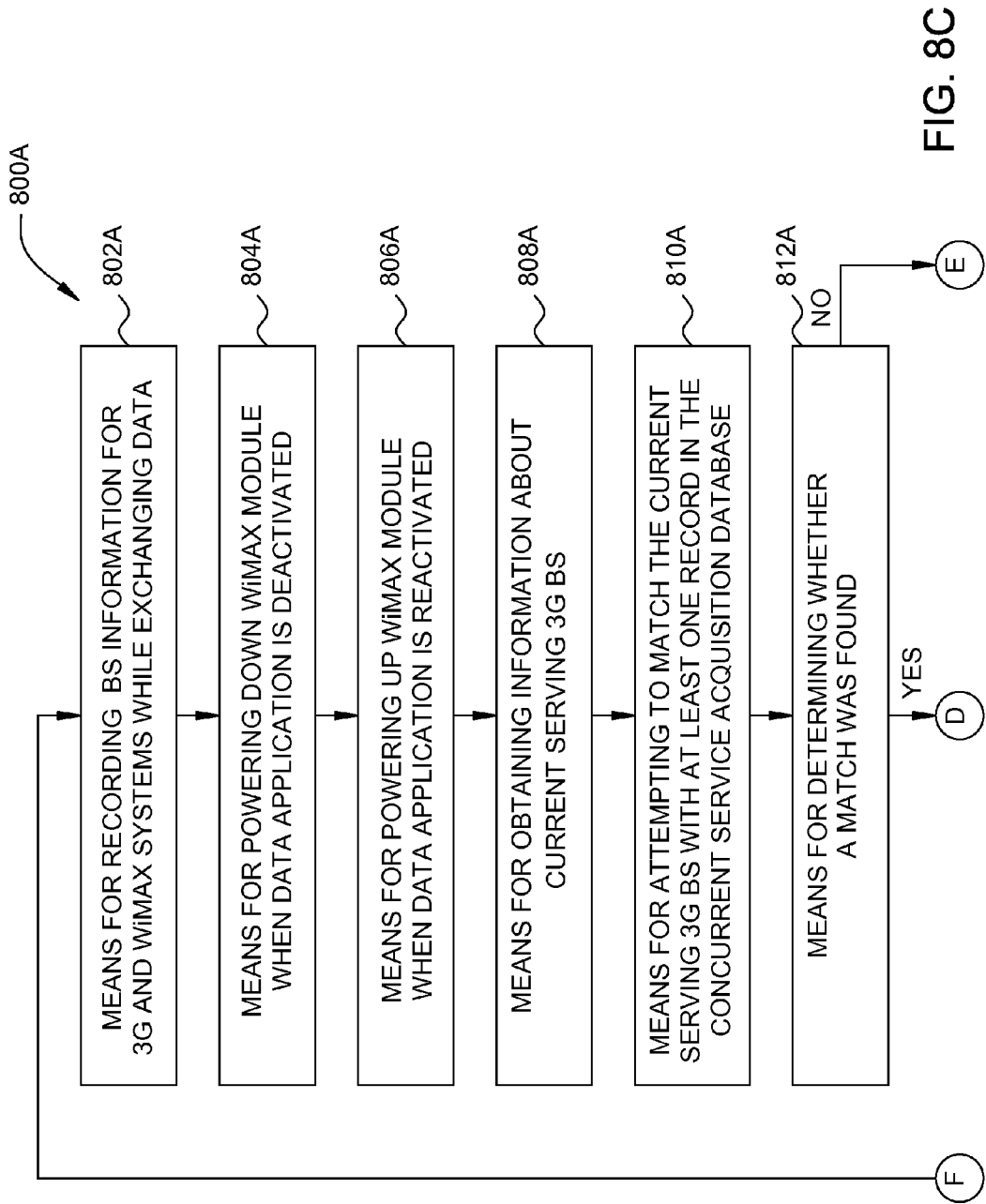

| SID (906) | 3G NID (908) | PZID (910) | CH (912) | WiMAX NAP (914) | NSP (916) | Wi-Fi CH (1108) | SSID (1110) | LAST UPDATE TIME (918) |
|---|---|---|---|---|---|---|---|---|
| 1 | 2 | 2222 | 22 | 222 | 1 | 6 | "Office" | 2008-6-1 10:01:10 |
| 1 | 3 | 3333 | 33 | 333 | 1 | 6 | "Home" | 2008-6-1 08:00:10 |
| 1 | 2 | 2222 | 23 | 223 | 1 | 6 | "Office" | 2008-4-1 01:00:10 |
| 1 | 4 | 4444 | N/A | N/A | N/A | N/A | N/A | 2008-6-1 12:00:10 |

FIG. 11

QUICK SYSTEM SELECTION AND ACQUISITION FOR MULTI-MODE MOBILE DEVICES

TECHNICAL FIELD

Certain embodiments of the present disclosure generally relate to wireless communications and, more particularly, to establishing multiple connections for a multi-mode mobile station (MS) to two or more different network services based on network topology information.

BACKGROUND

Orthogonal frequency-division multiplexing (OFDM) and orthogonal frequency division multiple access (OFDMA) wireless communication systems under IEEE 802.16 use a network of base stations to communicate with wireless devices (i.e., mobile stations) registered for services in the systems based on the orthogonality of frequencies of multiple subcarriers and can be implemented to achieve a number of technical advantages for wideband wireless communications, such as resistance to multipath fading and interference. Each base station (BS) emits and receives radio frequency (RF) signals that convey data to and from the mobile stations.

Generally, batteries provide power for most mobile stations, and therefore, power consumption is a concern for MS design engineers. For many radio access technologies (RATs), there is typically a low power standby mode to save battery power. On multi-mode wireless devices, the device may be registered to multiple network services at the same time. For example, a smart phone may be registered to both a 3G network (for voice calls and text messaging) and a WiMAX network (for high-speed Internet access) at the same time. Both 3G and WiMAX networks typically demand that the multi-mode device report to the serving BS to ensure continued communication. Even during standby modes, periodic registration may be required, and staying registered to both network systems consumes power.

SUMMARY

Certain embodiments of the present disclosure generally relate to using network topology information from one radio access technology (RAT) network to assist acquisition of another different RAT network for a multi-mode mobile station (MS), such as acquiring a WiMAX (Worldwide Interoperability for Microwave Access) network based on topology information about a 3G (Third Generation) network, and vice versa. Acquisition assisted in this manner may provide for quick restoration of a previously interrupted or deactivated network service, while decreasing the power consumption of the MS during a power savings state because periodic scanning and registration need not occur.

Certain embodiments of the present disclosure provide a method for accessing a network with a multi-mode MS capable of communicating via at least first and second RATs. The method generally includes establishing a connection with a first base station to access the network via the first RAT, accessing, based on information about the first base station, a concurrent service acquisition database to obtain information about at least a second base station that provides access to the network via the second RAT, and attempting to establish a connection with the second base station using the obtained information.

Certain embodiments of the present disclosure provide a computer-program product for accessing a network with a multi-mode MS capable of communicating via at least first and second RATs. The computer-program product typically includes a computer-readable medium having instructions stored thereon, the instructions being executable by one or more processors. The instructions generally include instructions for establishing a connection with a first base station to access the network via the first RAT; instructions for accessing, based on information about the first base station, a concurrent service acquisition database to obtain information about at least a second base station that provides access to the network via the second RAT; and instructions for attempting to establish a connection with the second base station using the obtained information.

Certain embodiments of the present disclosure provide an apparatus for accessing a network and capable of communicating via at least first and second RATs. The apparatus generally includes means for establishing a connection with a first base station to access the network via the first RAT; means for accessing, based on information about the first base station, a concurrent service acquisition database to obtain information about at least a second base station that provides access to the network via the second RAT; and means for attempting to establish a connection with the second base station using the obtained information.

Certain embodiments of the present disclosure provide a multi-mode mobile device for accessing a network and capable of communicating via at least first and second RATs. The mobile device generally includes first connection logic configured to establish a connection with a first base station to access the network via the first RAT; database logic configured to access, based on information about the first base station, a concurrent service acquisition database to obtain information about at least a second base station that provides access to the network via the second RAT; and second connection logic configured to attempt to establish a connection with the second base station using the obtained information.

BRIEF DESCRIPTION OF THE DRAWINGS

So that the manner in which the above recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIGS. 8C and 8D illustrate means corresponding to the example operations of FIGS. 8A and 8B, respectively, for attempting to restore the connection to the second BS that can provide concurrent network service to the multi-mode MS via the second RAT, in accordance with certain embodiments of the present disclosure.

FIG. 11 is a table of BS information pairs for three different RATs (e.g., 3G, WiMAX, and Wi-Fi) sharing coverage area and capable of providing concurrent network service to a multi-mode MS, in accordance with certain embodiments of the present disclosure.

DETAILED DESCRIPTION

Figure 1:
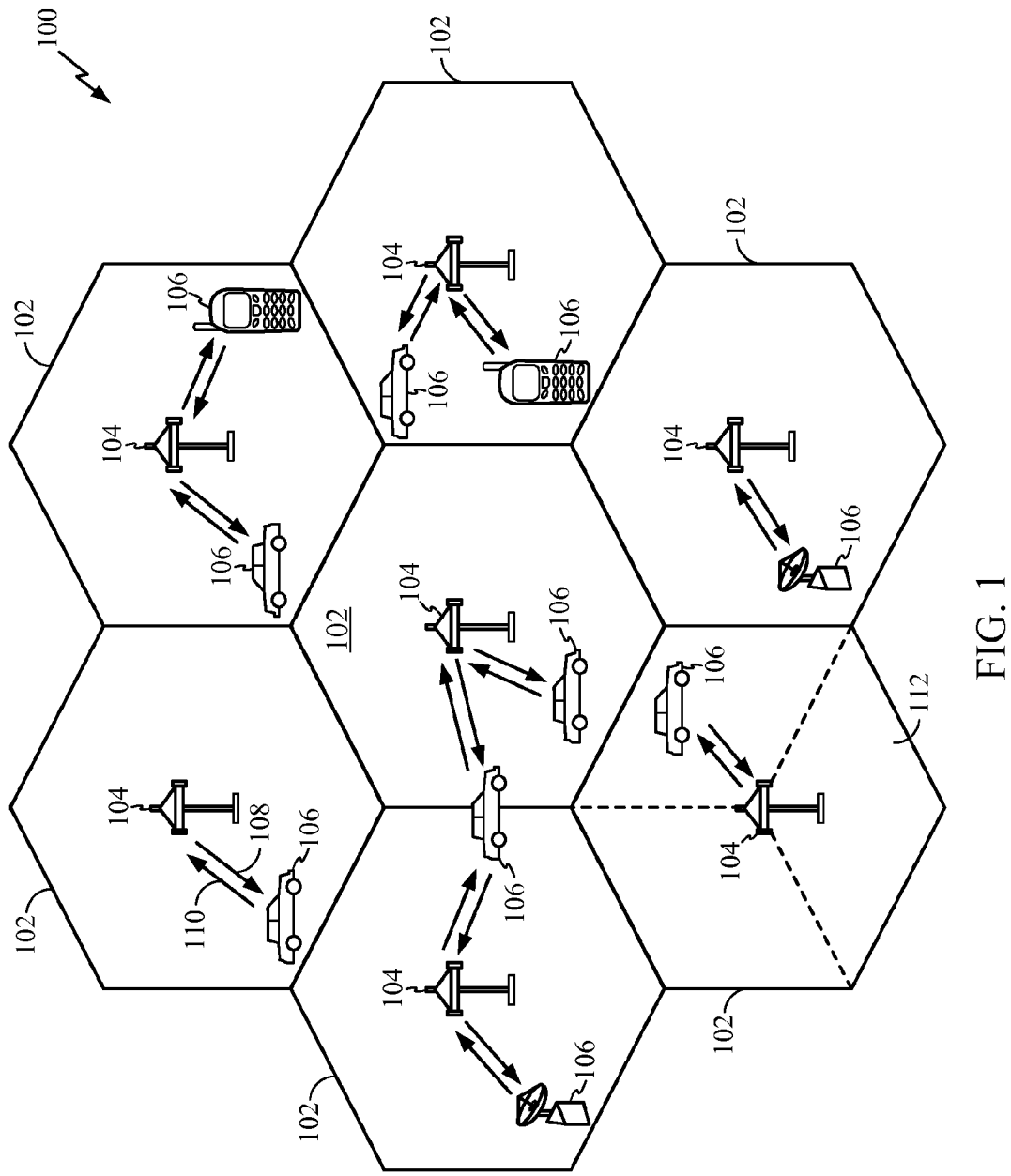
FIG. 1 illustrates an example wireless communication system, in accordance with certain embodiments of the present disclosure.

Certain embodiments of the present disclosure provide methods and apparatus for using network topology and coverage information from one radio access technology (RAT) network to assist acquisition of another different RAT network for a multi-mode mobile station (MS), such as acquiring a WiMAX (Worldwide Interoperability for Microwave Access) network based on topology and coverage information about a 3G (Third Generation) network, and vice versa. Base station (BS) acquisition assisted in this manner may provide for quick restoration of a previously interrupted or deactivated network service, while decreasing the power consumption of the multi-mode MS during a power savings state because periodic scanning and registration need not occur.

Exemplary Wireless Communication System

The methods and apparatus of the present disclosure may be utilized in a broadband wireless communication system. The term "broadband wireless" refers to technology that provides wireless, voice, Internet, and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility, and strong multipath immunity over conventional single carrier modulation schemes.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers (PCs), etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
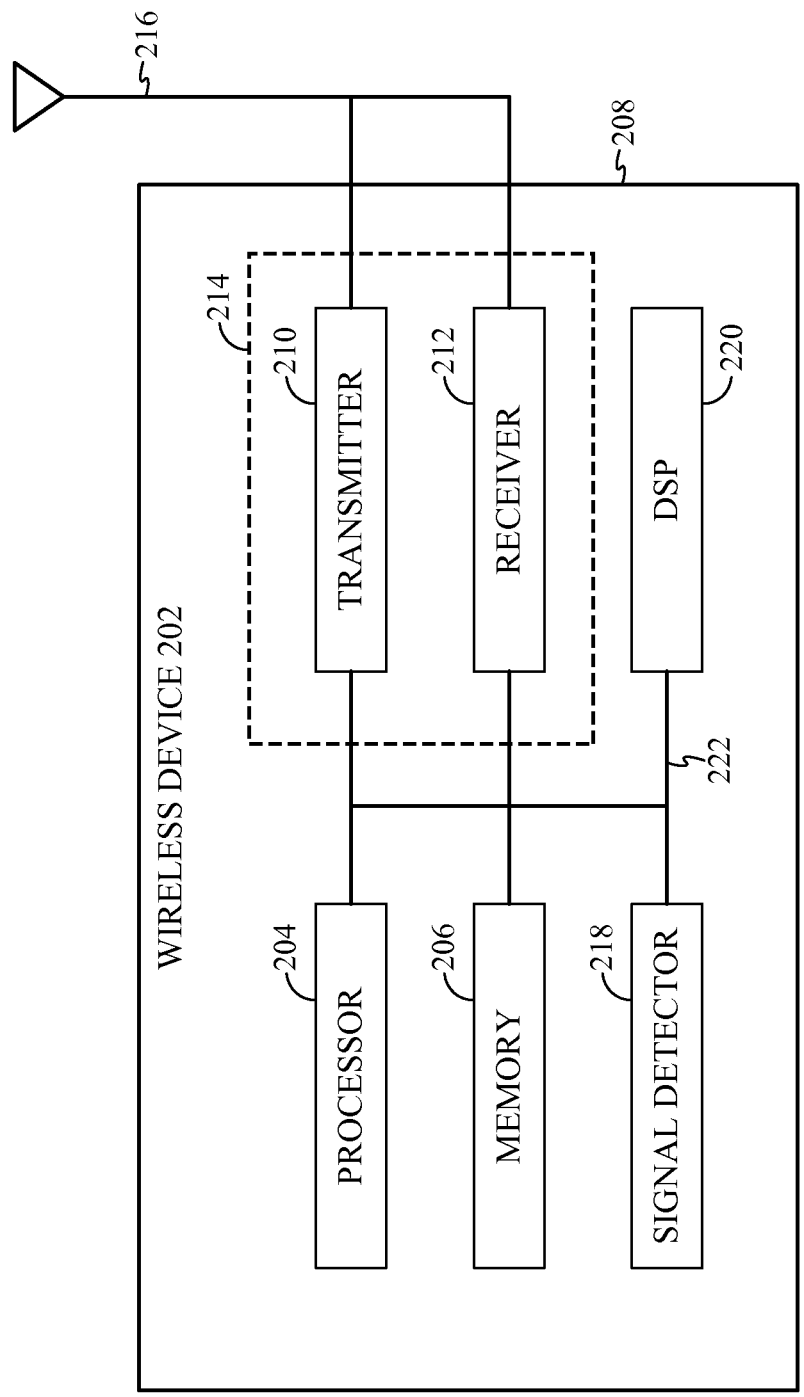
FIG. 2 illustrates various components that may be utilized in a wireless device, in accordance with certain embodiments of the present disclosure.

FIG. 2 illustrates various components that may be utilized in a wireless device 202. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy from pilot subcarriers or signal energy from the preamble symbol, power spectral density, and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
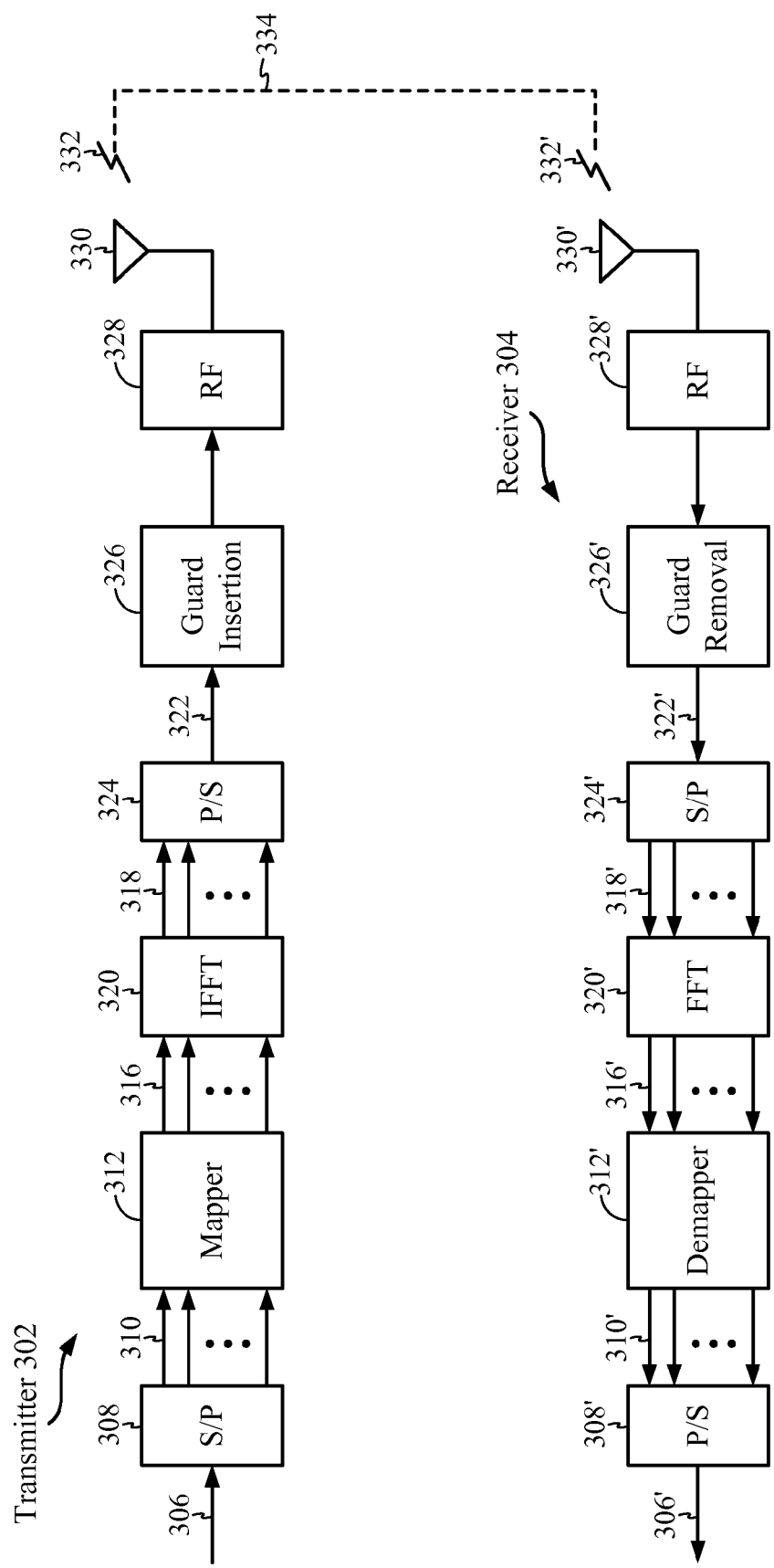
FIG. 3 illustrates an example transmitter and an example receiver that may be used within a wireless communication system that utilizes orthogonal frequency-division multiplexing and orthogonal frequency division multiple access (OFDM/OFDMA) technology, in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, $N_s$, is equal to $N_{cp}$ (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless communication system 100 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, this data stream 306' corresponds to the data 306 that was provided as input to the transmitter 302.

Exemplary Network Topology with Multiple Overlaying Networks

Figure 4:
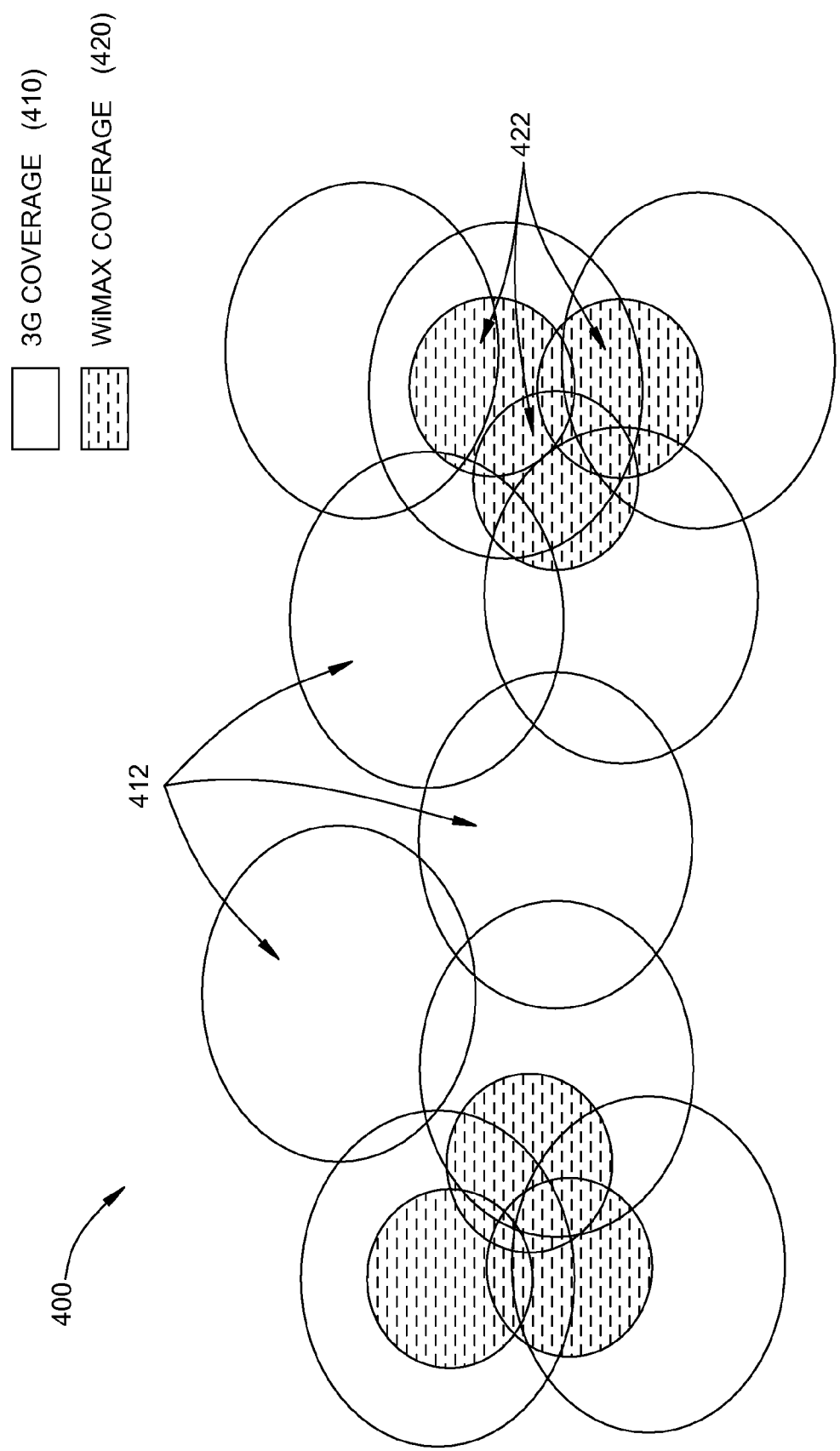
FIG. 4 illustrates a network topology with WiMAX network coverage areas overlaying 3G network coverage areas, in accordance with certain embodiments of the present disclosure.

FIG. 4 illustrates a network topology 400 with two different network systems 410, 420 overlaying one another, providing overlapping network coverage via two different radio access technologies (RATs). For example, one network may be a 3G (the third generation of mobile phone standards and technology) system 410, which may provide network service via any one of various 3G RATs including EVDO (Evolution-Data Optimized), 1×RTT (1 times Radio Transmission Technology, or simply 1×), W-CDMA (Wideband Code Division Multiple Access), UMTS-TDD (Universal Mobile Telecommunications System-Time Division Duplexing), HSPA (High Speed Packet Access), GPRS (General Packet Radio Service), and EDGE (Enhanced Data rates for Global Evolution). The 3G network 410 is a wide area cellular telephone network that evolved to incorporate high-speed internet access and video telephony, in addition to voice calls. Furthermore, a 3G network 410 may be more established and provide larger coverage areas 412 than other network systems. 3G network service is provided by a 3G base station in each coverage area 412.

The other overlaying network system may be a high speed data network, such as a Wi-Fi (according to IEEE 802.11) or a WiMAX network system 420, for example. The WiMAX network 420 may be preferred over the 3G network 410 for high speed data services, but the 3G network 410 may provide adequate bandwidth for high speed data depending on the desired quality of service (QoS) and the available 3G RAT. The WiMAX network 420 may be less established than the 3G network 410 and may provide smaller coverage areas 422 as illustrated in FIG. 4. WiMAX network service is provided by a WiMAX base station in each coverage area 422.

For multi-mode mobile stations (e.g., smart phones capable of voice calls, accessing the Internet, and real-time video), various applications may access multiple network systems concurrently. For example, many users may use the high speed data service provided by the WiMAX network 420 in a relatively local high speed data hotspot while simultaneously connected to the 3G network 410 for voice calls, SMS (Short Message Service, or text messaging), or other low data rate applications. If the user leaves such a hotspot or if no WiMAX data is transmitted for a certain time, the high speed data application may be suspended temporarily, and the application may be subsequently restored, potentially at another hotspot location, when the WiMAX network service is available once again.

During this transition, a 3G application, such as voice calling, may remain connected to the 3G network 410 to wait for paging for a voice call or SMS, while at least a portion of the high speed data service components (e.g., a WiMAX module or circuit block of the multi-mode MS) may be turned off to save power and, thus, battery life. During this WiMAX power-saving state, however, periodic registration may be performed according to the IEEE 802.16 standard, and staying registered for both networks 410, 420 may consume power needlessly.

For mobile wireless devices with un-coordinated 3G and WiMAX modules, the user may choose to shut down the WiMAX module at certain times in an effort to save power and increase standby time. However, user-controlled shut down may present a number of problems. First, the user may take time-consuming manual steps to turn on/off the WiMAX module. Second, the WiMAX module may require and fresh scanning and registration of the serving base station. Third, resident data applications on the multi-mode MS may lose data connectivity.

Accordingly, what are needed are techniques and apparatus for quickly restoring high speed connection to a multi-mode MS, yet keeping the power consumption low.

Exemplary Assisted Acquisition for a Multi-Mode Mobile Station (MS)

Figure 5:
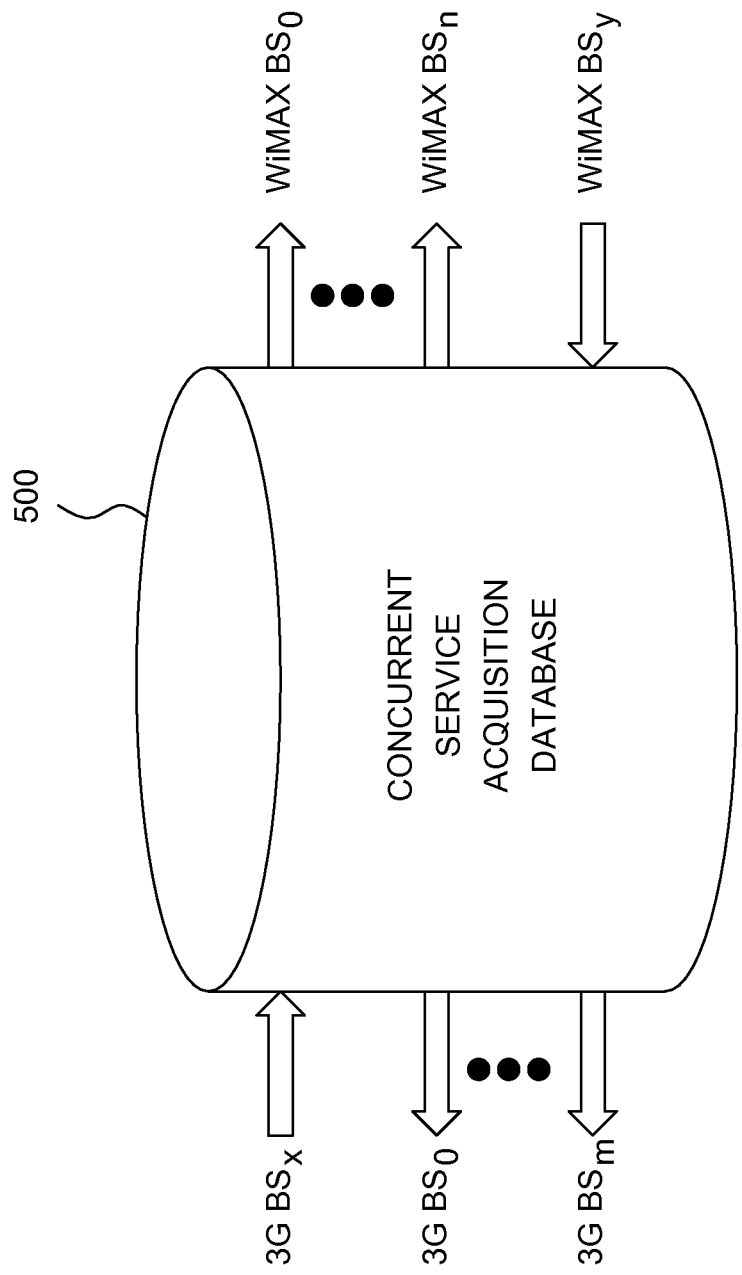
FIG. 5 illustrates a concurrent service acquisition database that may be accessed to obtain information about at least one base station (BS) providing network service to a multi-mode mobile station (MS) via a second radio access technology (RAT) by knowing information about the current serving BS capable of concurrently providing service via a first RAT, in accordance with certain embodiments of the present disclosure.

FIG. 5 illustrates a concurrent service acquisition database 500 that may be accessed to obtain information about at least one BS capable of providing network service to a multi-mode MS via a second radio access technology (RAT) by knowing information about the current serving BS capable of concurrently providing service via a first RAT. The records of information in the database 500 (i.e., concurrent service acquisition records) may be provided to the multi-mode MS by the network service provider or device manufacturer, may be transmitted to the multi-mode MS by the network during device activation or subsequent operation, or may be learned by the multi-mode MS during normal operations.

For example, information about a particular 3G base station ($BS_x$) currently providing network service may be input to the database 500 in an effort to find concurrent service acquisition records with information concerning one or more WiMAX base stations ($BS_{0 \ldots n}$) that may provide network service overlaying at least a portion of the coverage area for the current 3G $BS_x$. In the other direction, information about a particular WiMAX base station ($BS_y$) currently providing network service may be input to the database 500 in an effort to find concurrent service acquisition records with information concerning one or more BS base stations ($BS_{0 \ldots m}$) that may provide network service overlaying at least a portion of the coverage area for the current WiMAX $BS_y$.

Figure 6:
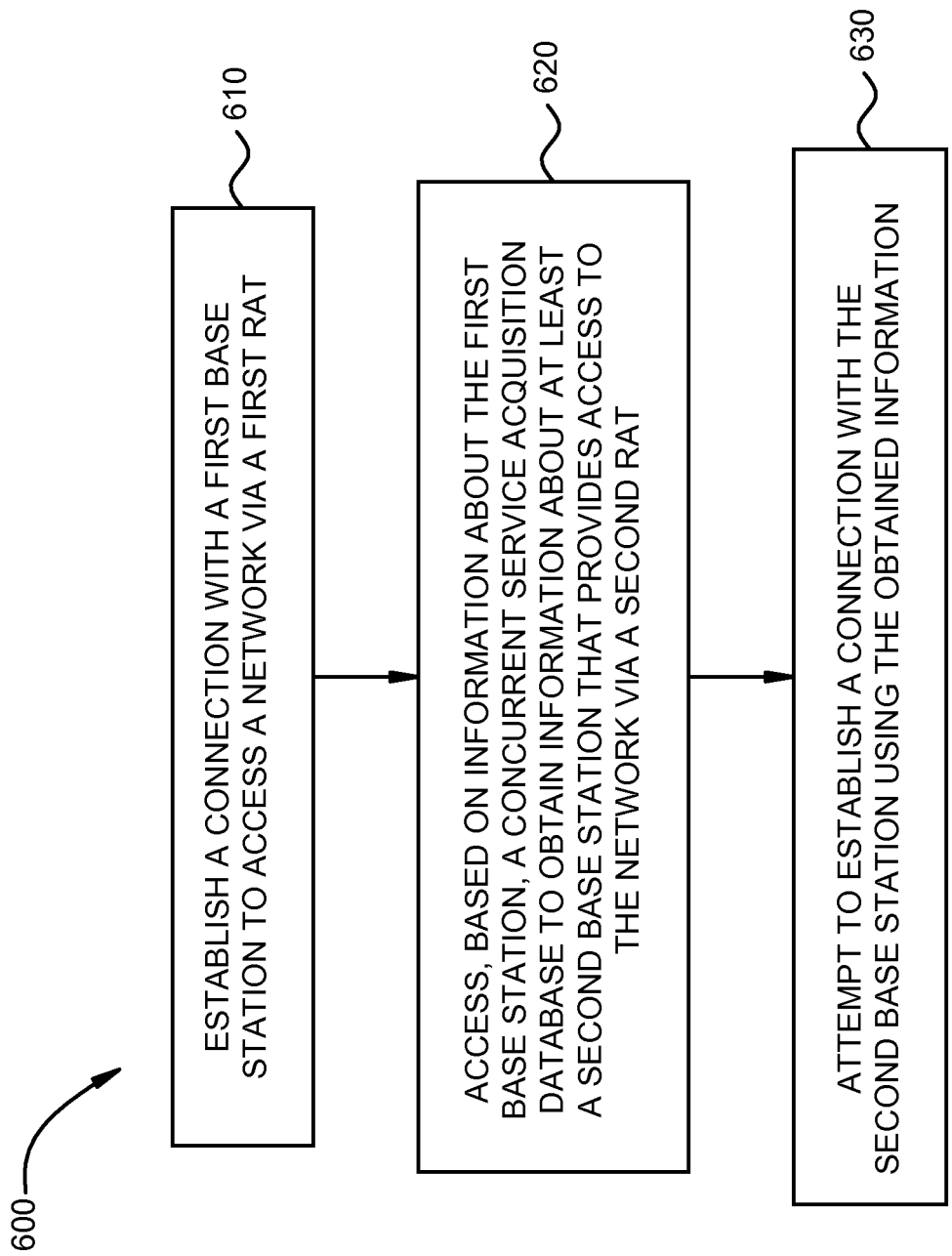
FIG. 6 is a flow diagram of example operations for utilizing a concurrent service acquisition database to obtain, based on information about a first BS providing network service via a first RAT, information about at least a second BS providing network service via a second RAT in an effort to establish connections with two BSs such that concurrent network service via the first and second RATs may be provided to a multi-mode MS, in accordance with certain embodiments of the present disclosure.

FIG. 6 is a flow diagram of example operations 600 for utilizing the concurrent service acquisition database 500 to obtain, based on information about a first BS providing network service via a first RAT, information about at least a second BS providing network service via a second RAT in an effort to establish connections with two BSs such that concurrent network service via the first and second RATs may be provided to a multi-mode MS.

The operations 600 begin, at 610, by establishing a connection with a first base station to access a network via a first RAT. For example, the first BS may be a 3G BS in the 3G network 410. Once the connection is established, information about the first BS—such as a System Identification Number (SID), a Network Identification Number (NID), and a Packet Zone Identification Number (PZID)—may be determined for some embodiments.

At 620, the concurrent service acquisition database 500 may be accessed to obtain, based on information about the first BS, information about at least a second BS that provides access to the network via a second RAT. For example, the database 500 may be accessed to provide information about one or more WiMAX BSs in the WiMAX network 420 that may provide network service overlaying at least a portion of the coverage area for the current 3G BS. For some embodiments, the information for the first BS (e.g., the current 3G BS) may point to one or more concurrent service acquisition records containing information about at least a second BS (e.g., one or more WiMAX BSs). In the case of a WiMAX BS, the information may include, for example, a channel number, a Network Access Provider (NAP), a Network Service Provider (NSP), and/or a Base Station Identification Number (BSID).

At 630, the multi-mode MS may attempt to establish a connection with the second BS using the information obtained at 620. Because the multi-mode MS already has the information for the second BS, network service to the second BS may be acquired relatively quickly. The multi-mode MS may then receive concurrent network service from, for example, the 3G and the WiMAX networks 410, 420. In this manner, the multi-mode MS need not scan for the second BS during a power savings state since the database 500 may provide the same information (e.g., channel number) as a scan.

Figure 7A:
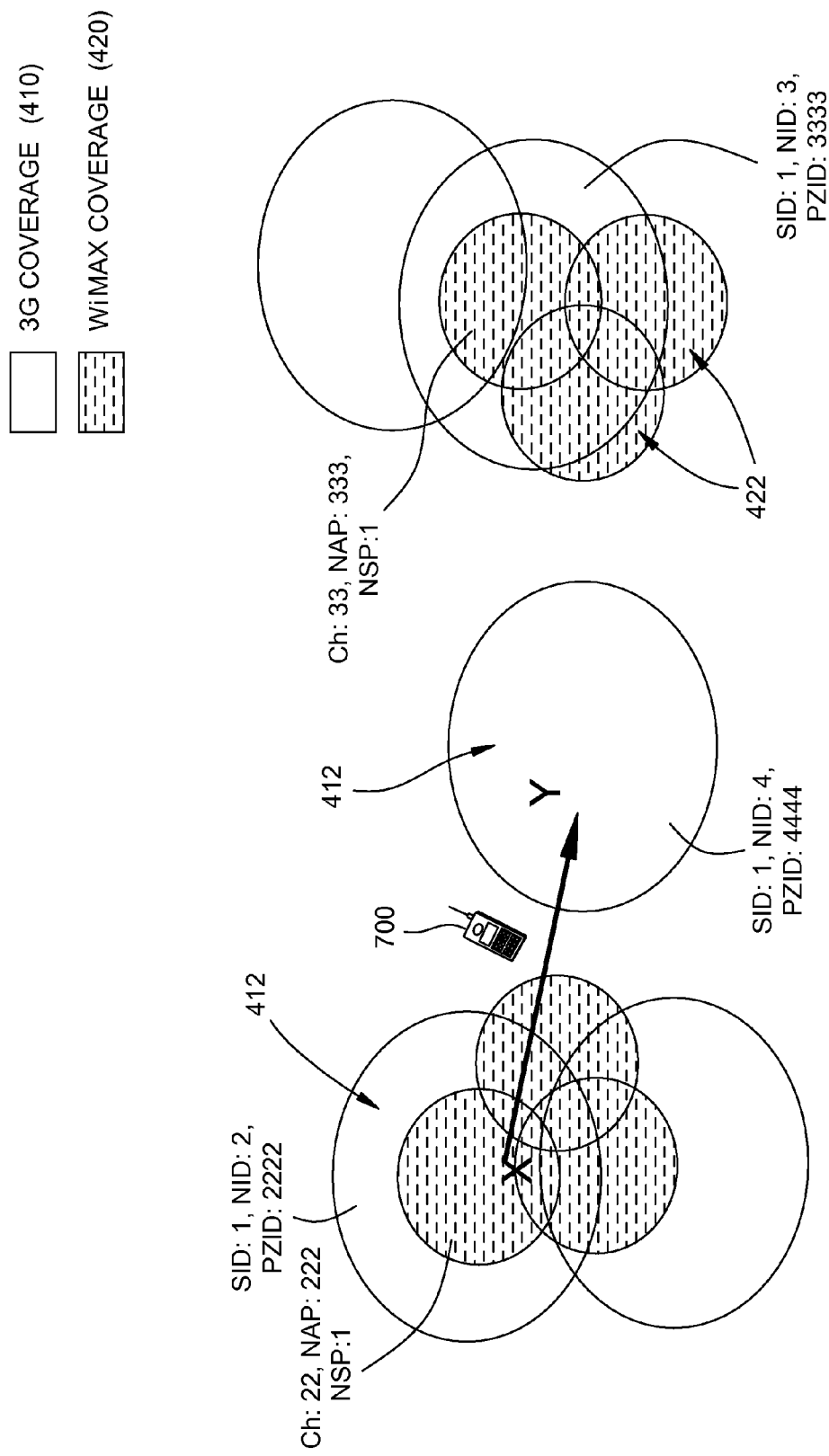
FIG. 7A illustrates a mobility scenario where a multi-mode MS moves from a location currently serviced by two RATs (e.g., 3G and WiMAX) to a location serviced by only one RAT (e.g., 3G), in accordance with certain embodiments of the present disclosure.

FIG. 7A illustrates a mobility scenario where a multi-mode MS 700 moves in the network topology 400 of FIG. 4 from a location X currently serviced by two RATs (e.g., 3G and WiMAX), such as an office or a school, to a location Y serviced by only one RAT (e.g., 3G), such as a restaurant or a store. At location X, the BS providing 3G network service may have a SID=1, a NID=2, and a PZID=2222, and the BS providing WiMAX network service at location X may have a Ch=22, a NAP=222, and a NSP=1 as illustrated.

There is no WiMAX service at location Y, so the user may manually terminate the high speed data application running on the multi-mode MS 700 before leaving location X. In another scenario, the multi-mode MS 700, upon realizing that there is no more WiMAX data being sent as the MS 700 moves outside the WiMAX network 420 on its way to location Y, may enter a power-savings state (e.g., sleep mode or idle mode) and may partially or completely power down the WiMAX module. At location Y, the BS providing 3G network service may have a SID=1, a NID=4, and a PZID=4444. Thus, the multi-mode MS 700 may make and receive voice calls, perform SMS, and use other lower data rate applications at location Y, but the MS 700 may most likely not be able to use WiMAX. Depending on the desired QoS and the available 3G RAT at location Y, the multi-mode MS 700 may be able to use the 3G network 410 for some high speed data applications.

Figure 7B:
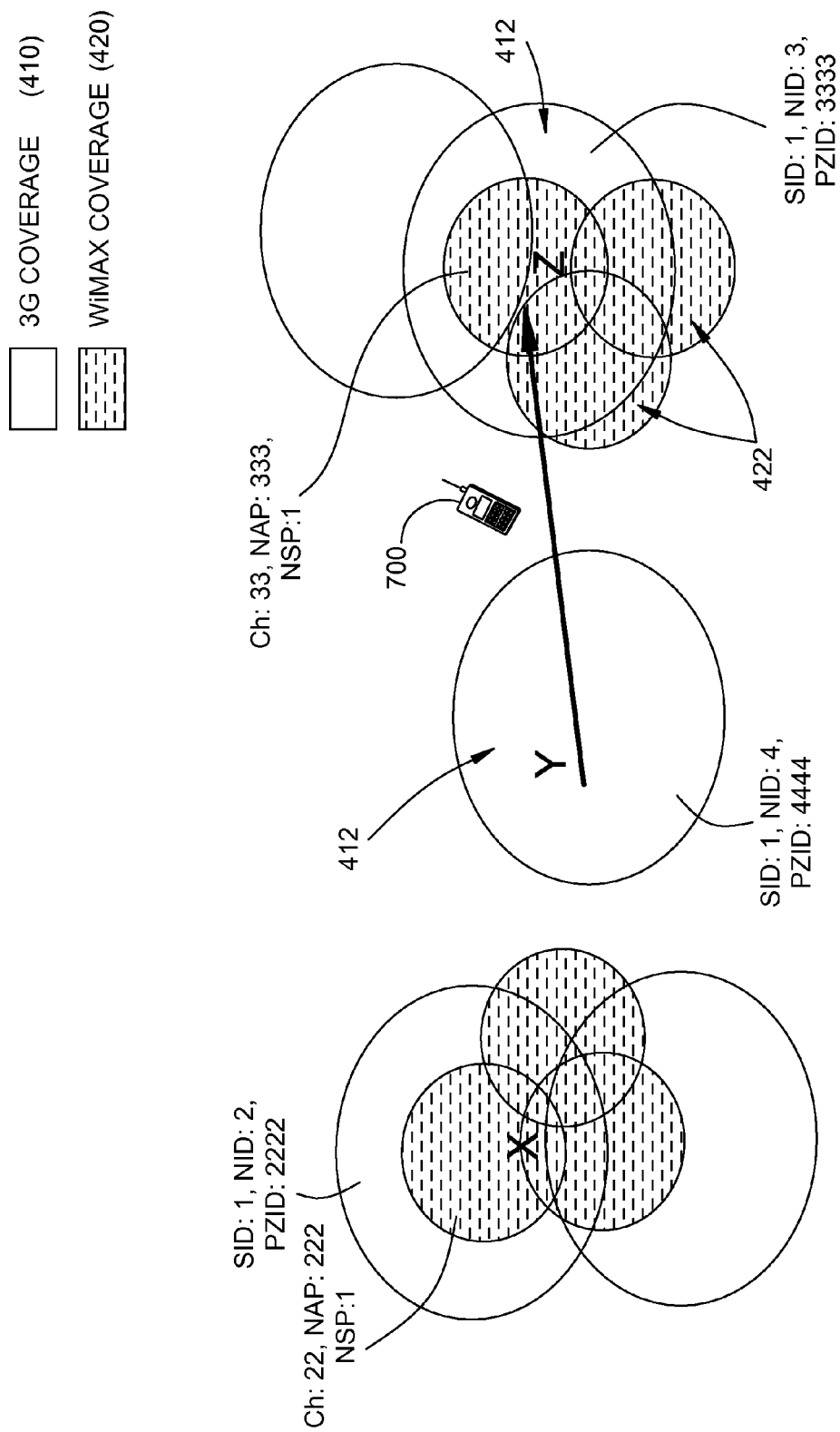
FIG. 7B illustrates a mobility scenario where a multi-mode MS moves from a location currently serviced by only one RAT (e.g., 3G) to a location serviced by two RATs (e.g., 3G and WiMAX), in accordance with certain embodiments of the present disclosure.

FIG. 7B illustrates a mobility scenario where the multi-mode MS 700 moves from location Y to a location Z serviced by two RATs (e.g., 3G and WiMAX), such as a home, a coffee shop, or an Internet café. At location Z, the BS providing 3G network service may have a SID=1, a NID=3, and a PZID=3333, and the BS providing WiMAX network service at location Z may have a Ch=33, a NAP=333, and a NSP=1 as illustrated. Because WiMAX service is available at location Z, the user may manually start a high speed data application running on the multi-mode MS 700 upon reaching location Z. The multi-mode MS 700 may exit the power-savings state and power up the WiMAX module, or the multi-mode MS 700 may initially attempt to use its 3G module for handling the high speed data application, resorting to the WiMAX module if the attempt fails. In another scenario, if the user was running a high speed data application at location Y using the 3G network 410, the multi-mode MS 700 may continue using the 3G network service as the MS moves from location Y to location Z.

Figure 8A:
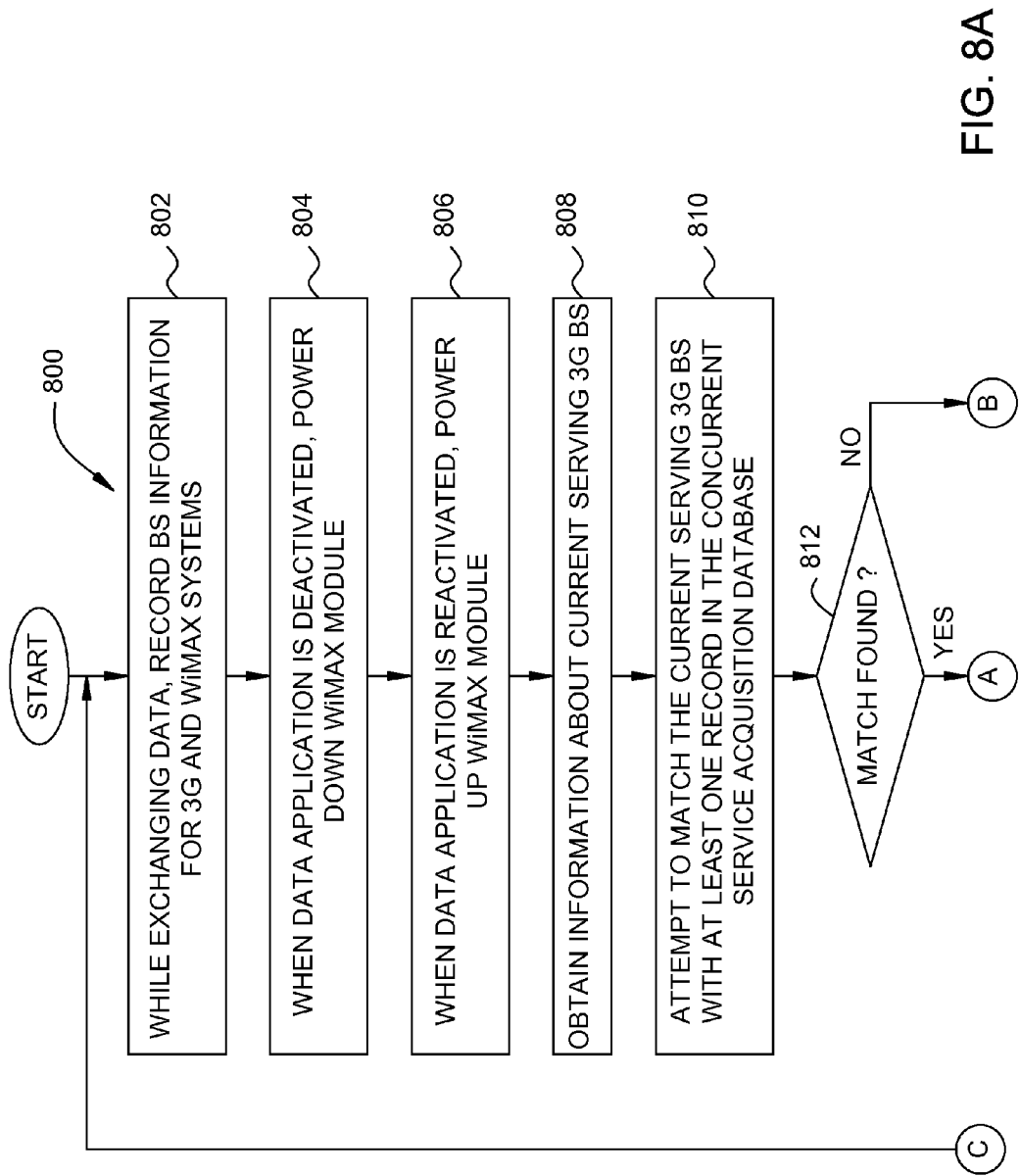
FIGS. 8A and 8B illustrate example operations for attempting to restore a connection to a second BS that can provide concurrent network service to a multi-mode MS via a second RAT by utilizing a concurrent service acquisition database having information about a first BS currently providing network service via a first RAT that may be associated with the second BS, in accordance with certain embodiments of the present disclosure.
Figure 8B:
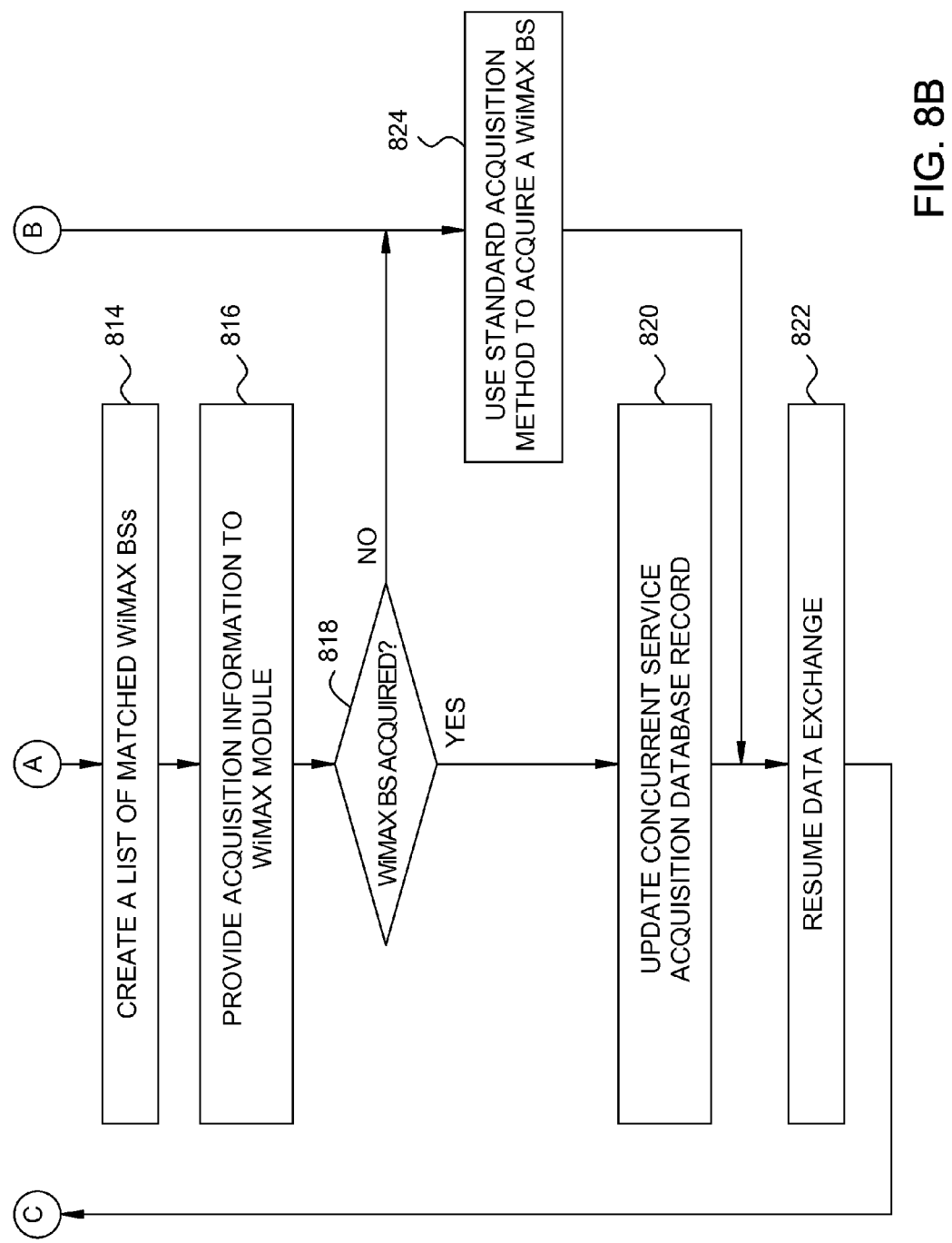

FIGS. 8A and 8B illustrate example operations 800 for attempting to restore a connection to a second BS that can provide concurrent network service to a multi-mode MS 700 via a second RAT (e.g., WiMAX) by utilizing a concurrent service acquisition database 500 having information about a first BS currently providing network service via a first RAT (e.g., 3G) that may be associated with the second BS, in accordance with certain embodiments of the present disclosure. The operations 800 begin, at 802, by recording BS information for the 3G and WiMAX networks 410, 420 while the MS 700 is operational, such as while exchanging data with the concurrent networks. This BS information may include the BSID, SID, NID, channel number, and a portion of the preamble as described above. During active operations at 802, the multi-mode MS 700 may store the acquired 3G and WiMAX system information as a pair in a concurrent services acquisition record of the concurrent service acquisition database 500.

Figure 9:
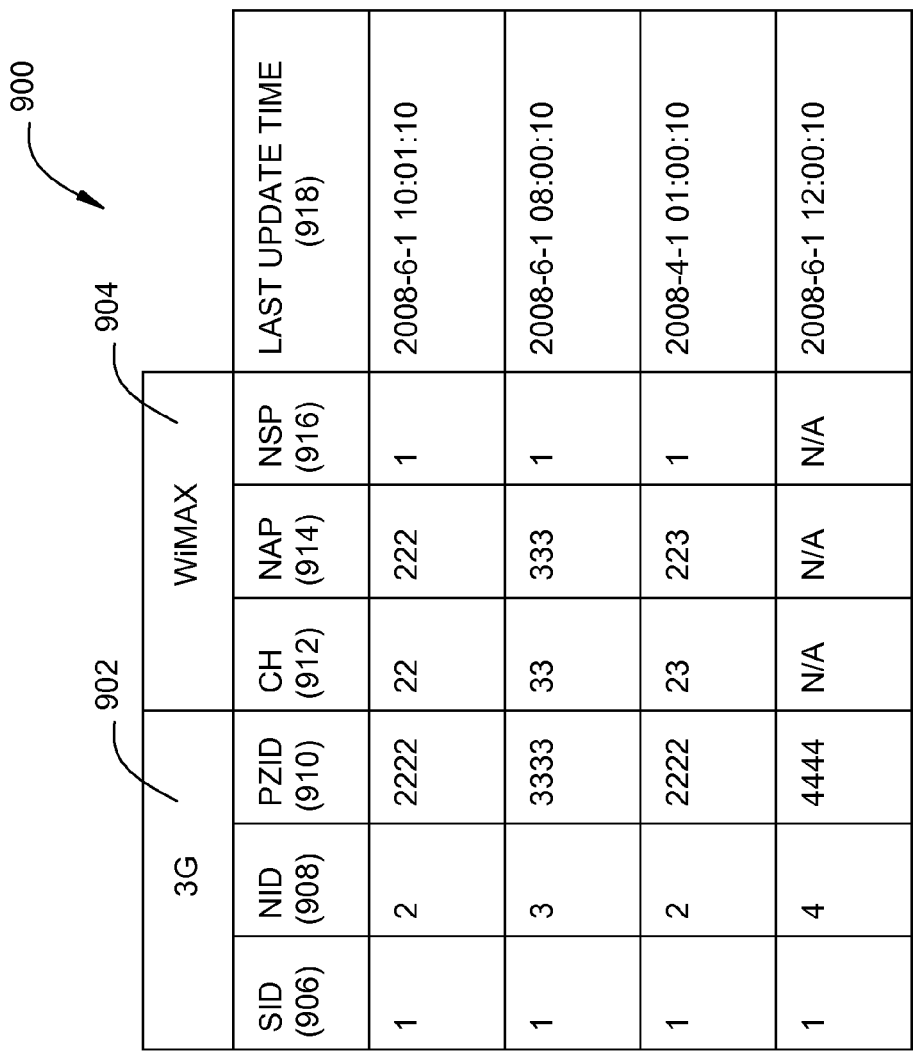
FIG. 9 is a table of BS information pairs for two different RATs sharing coverage area and capable of providing concurrent network service to a multi-mode MS, in accordance with certain embodiments of the present disclosure.

FIG. 9 illustrates an example table 900 of such BS information pairs that provide concurrent service in a certain overlapping coverage area, where each row may be stored as a record in the concurrent service acquisition database 500. The columns of the table 900 may be grouped into a 3G section 902 and a WiMAX section 904, where each section contains information for the BS providing that particular network service for the coverage area associated with a certain row. The 3G section 902 may contain a SID column 906, a NID column 908, and a PZID column 910. The WiMAX section 904 may contain a channel number column 912, a NAP column 914, and a NSP column 916. The entries in table 900 correspond to the BS information from FIGS. 7A and 7B.

Since the coverage and network topologies of the 3G network 410 and the WiMAX network 420 may be different, a 3G BS may match to multiple WiMAX BSs, and vice versa. For example, the 3G base station with SID=1, NID=2, and PZID=2222 matches two records: one having a Ch=22, a NAP=222, and a NSP=1 and another having a Ch=23, a NAP=223, and a NSP=1. Multiple matches indicate that one BS provides coverage via one RAT that overlaps multiple portions of coverage areas provided by multiple BSs using another RAT.

Furthermore, some rows may have empty entries in one of the sections 902, 904 indicating that network service via one RAT is missing from a coverage area provided by another RAT. For example, the 3G BS with SID=1, NID=4, and PZID=444 in FIGS. 7A and 7B provides 3G coverage for a particular area, but there is no WiMAX coverage area 422 within this 3G coverage area. Therefore, the corresponding record (i.e., the last row of the table 900) within the WiMAX section 904 may be empty or may include values indicating that there is no WiMAX network service available in this area. Should a high-speed data application be launched in this area, the multi-mode MS 700 may predict the absence of a WiMAX network. For some embodiments, the multi-mode MS may direct the call to a lower-speed 3G network. As an alternative for some embodiments, an operator may instruct the multi-mode MS to turn on WiMAX and to scan manually in an effort to update the database 500.

Each concurrent service acquisition record in the table 900 may also include a last update time column 918 for a time stamp as shown. Because the network topology and coverage of the 3G network or the WiMAX network may change with time, the time stamp may indicate how recently the BS information pair was updated. The time stamp may be taken into consideration when prioritizing a list of matching BSs from the concurrent service acquisition database 500, as described in greater detail below. Furthermore, the time stamp may be used to select and delete older entries from the database 500 in an effort to conserve memory of the multi-mode MS 700.

As described above with respect to FIG. 5, the concurrent service acquisition records (i.e., the row entries in table 900) may be provided to the multi-mode MS 700 by the network service provider or device manufacturer, may be transmitted to the multi-mode MS by the network during device activation or subsequent operation, or may be learned by the multi-mode MS during normal operations. When the entries in the database 500 are learned, such as at 802, the database may adapt to changes in the network topology or coverage. Furthermore, only entries related to the coverage areas where the user operates the multi-mode MS may be stored, thereby using less memory than a database with concurrent service acquisition records for an entire region. These learned entries may be refined over time as the user continues to use the MS in these areas.

Figure 8D:
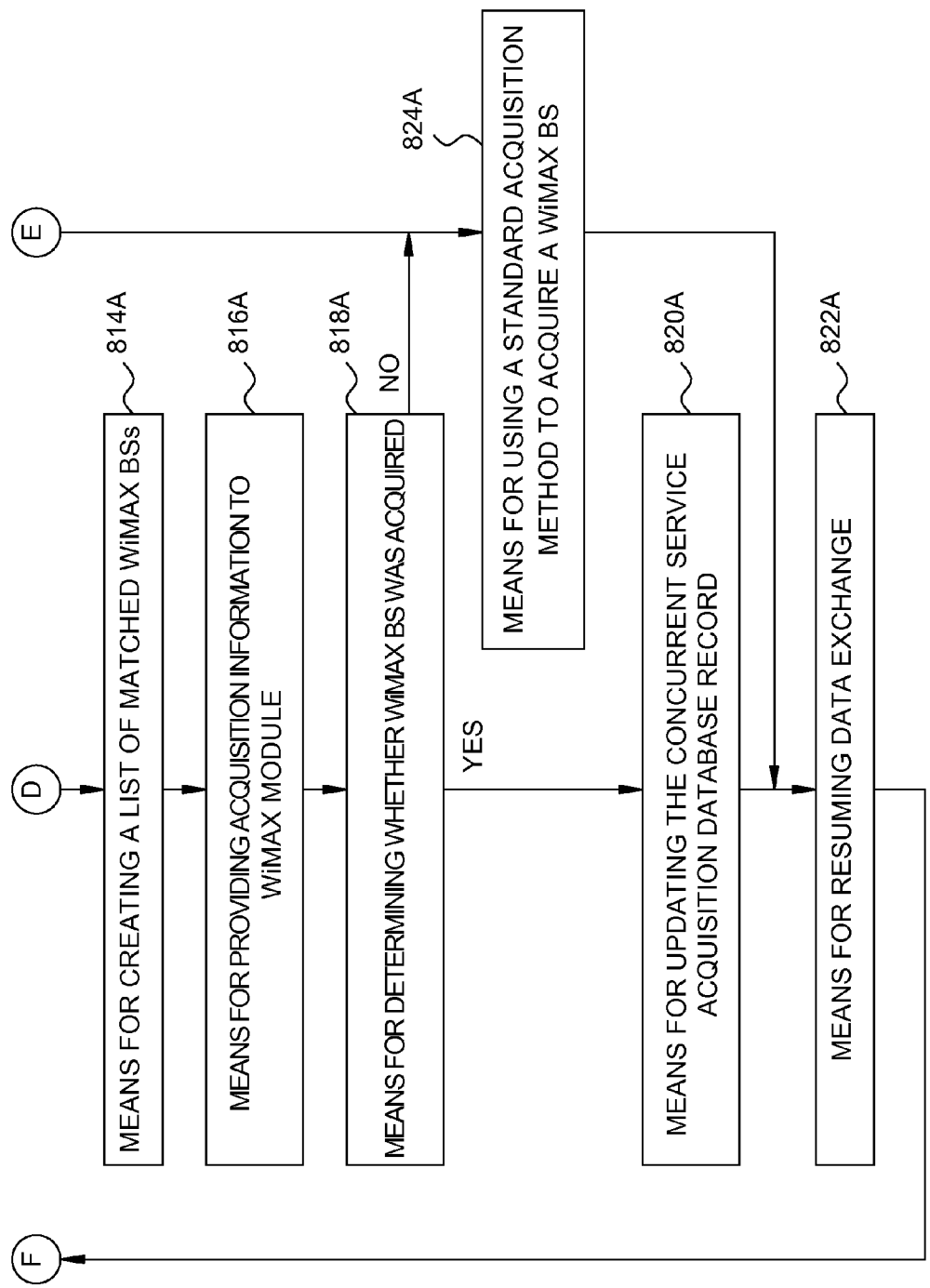

Returning to FIG. 8, the multi-mode MS 700 may continue operating normally at 802 for a period of time. At 804 when WiMAX data is no longer available for the multi-mode MS, the high speed data application is terminated, or the multi-mode MS 700 has moved out of the coverage area of the WiMAX network (e.g., moving from location X to location Y as in FIG. 7A), the WiMAX module may progressively enter sleep mode and idle mode as specified by the IEEE 802.16 standard, in an effort to save power. After a certain idle time, the multi-mode MS may completely or partially power down the WiMAX module. With a partial power down, the Media Access Control (MAC) layer software may operate in a suspend mode, and the RF circuitry may be turned off. The multi-mode MS may still perform a periodic low power refresh of the memory. With a complete power down, both the hardware and the MAC software may be shut down. Once the WiMAX module has been powered down, the multi-mode MS 700 may operate only with 3G network service, using a 3G-only power save mode as appropriate.

At 806 when the WiMAX data is available again, the same high speed data application is reactivated, a different high speed data application is started, or the multi-mode MS 700 has moved into the coverage area of the WiMAX network (e.g., moving from location Y to location Z as in FIG. 7B), the multi-mode MS 700 may initially power up the WiMAX module for some embodiments. For other embodiments, the multi-mode MS may initially try to route the high speed data through the 3G module, depending on the QoS and the available 3G RAT, in an effort to save power by leaving the WiMAX module powered down. If this attempt fails, the WiMAX module may be powered up at 806.

At 808, software or firmware running on the multi-mode MS may obtain information about the current serving 3G BS and may attempt to match this information with one or more records in the concurrent service acquisition database 500 at 810. If at least one match is found at 812, then the multi-mode MS may create a list of matched WiMAX BSs from the database 500 at 814. For some embodiments, this list may be prioritized according to any suitable entry provided in the database (e.g., a time stamp of when the BS information pair was last updated), a priority number assigned by the MS or provided with the database, a carrier-to-interference-plus-noise ratio (CINR) of a BS, a received signal strength indicator (RSSI) of a BS, and a round trip delay (RTD) to a BS. The CINR, RSSI, or RTD may be known from earlier measurements made during normal operations. For other embodiments, this list of matched WiMAX BSs may be ordered at random or according to the order in which the records were stored.

After the list of matched WiMAX BSs has been created at 814, the multi-mode MS 700 may provide BS acquisition information (e.g., the channel number, the BSID, and the NAP/NSP ID) to the WiMAX module at 816 for the first WiMAX BS in the matched list. If the multi-mode MS does not acquire this particular WiMAX BS, the multi-mode MS may provide BS acquisition information for the next WiMAX BS in the matched list to the WiMAX module and try to acquire this new BS. This process may continue until either a WiMAX BS from the list is acquired or there are no more entries in the list.

In this assisted manner, the multi-mode MS may quickly acquire or restore service to a WiMAX BS, much quicker than if the multi-mode MS had to scan for and acquire the WiMAX BS from scratch without any acquisition information. Furthermore, this method provides for quick acquisition without coordinated information on the network (i.e., on the base station side) or on the MS, such as a multi-mode Preferred Roaming List (PRL). For some embodiments, additional WiMAX-related parameters (e.g., the Downlink Channel Descriptor (DCD), the Uplink Channel Descriptor (UCD), and/or the security keys) for a given WiMAX BS may be stored and provided at 816 in an effort to speed up acquisition.

If the WiMAX BS is acquired from the list of matched WiMAX BSs at 818, then the multi-mode MS 700 may update the concurrent service acquisition record at 820. The record may be updated with a new time stamp or a new priority number, for example. The CINR, RSSI, or RTD for the BS may be updated in the record or in a separate memory location of the MS. In this manner, the concurrent service acquisition database 500 is kept current.

For some embodiments, regardless of whether or not the WiMAX BS is acquired at 818, the multi-mode MS 700 may scan for as-yet-unknown WiMAX BSs. If a new WiMAX BS is discovered during scanning, the MS may add a new record with a BS information pair for each new WiMAX BS and the current serving 3G BS to the concurrent service acquisition database 500. Furthermore, once the WiMAX BS is acquired, the multi-mode MS 700 may receive 3G and/or WiMAX neighbor BS information from the newly acquired WiMAX BS in a Neighbor Advertisement (MOB_NBR-ADV) message, for example. If the multi-mode MS receives new information about previously unknown 3G and/or WiMAX neighbor BSs from the newly acquired WiMAX BS, the MS may update the database 500 with the new information.

If a matched WiMAX BS is not found at 812 or if the multi-mode MS 700 fails to acquire a WiMAX BS from the list at 818, a conventional acquisition method may be used at 824 to scan for and potentially acquire an as-yet-unknown WiMAX BS. If a new WiMAX BS is discovered and acquired, a new record with a BS information pair for the new WiMAX BS and the current serving 3G BS may be added to the database 500. If no WiMAX BS is acquired within a certain amount of time, the MS 700 may update an existing database record to indicate that WiMAX coverage cannot be found at this particular 3G coverage area. Once a WiMAX BS has been acquired, data exchange between the multi-mode MS 700 and the WiMAX BS may resume at 822. The operations 800 may repeat at 802.

Exemplary Assisted Acquisition with Greater Than Two RATS

Figure 10:
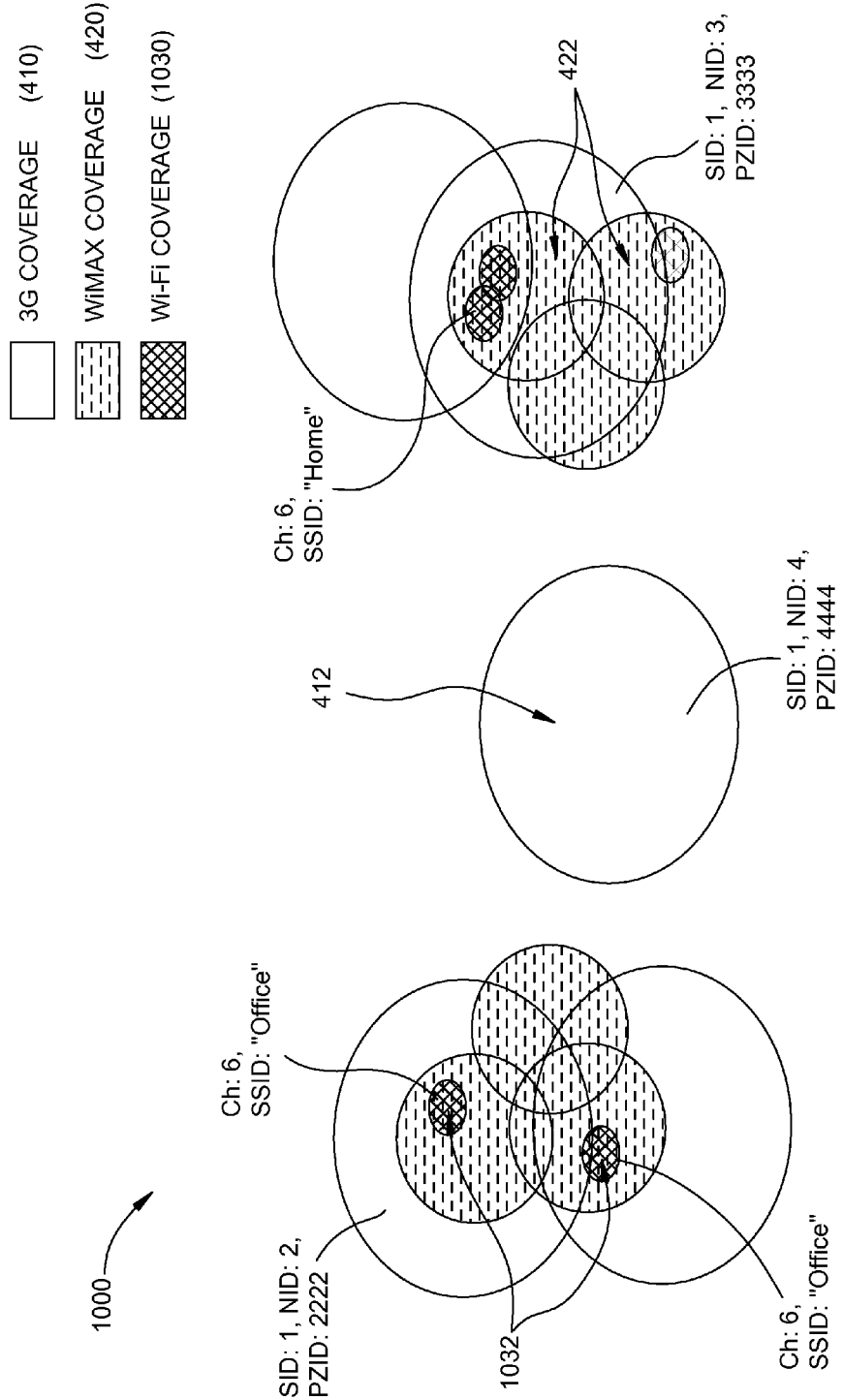
FIG. 10 illustrates a network topology with Wi-Fi network coverage areas overlying the WiMAX and 3G network coverage areas of FIG. 4, in accordance with certain embodiments of the present disclosure.

The techniques for assisted acquisition described above may be extended to networks with services provided by any two of various suitable RATs (other than the combination of 3G and WiMAX described above) and to networks with services provided by greater than two RATs. For example, FIG. 10 illustrates a network topology 1000 with a Wi-Fi network 1030 introduced to the network topology 400 of FIG. 4. Wi-Fi network coverage areas 1032 may overlay the 3G and WiMAX network coverage areas 412, 422 as illustrated.

For a multi-mode MS capable of concurrent network service via three or more RATs, the concurrent service acquisition database may be extended to take into account particular locations, such as Wi-Fi hotspots, where Wi-Fi network service, other wireless local area networks (WLANs), or Bluetooth may be available, in addition to 3G and/or WiMAX networks, for example. The multi-mode MS may choose whether to turn on a WLAN module or circuit block to take advantage of the available network and route data to the WLAN module.

FIG. 11 illustrates an example table 1100 of BS information for three different RATs (e.g., 3G, WiMAX, and Wi-Fi) sharing some coverage area and capable of providing concurrent network service to a multi-mode MS. The table 1100 adds a Wi-Fi section 1106 with one or more columns of Wi-Fi access point information to the example table 900 of FIG. 9. As depicted, the Wi-Fi section 1106 may contain a Wi-Fi channel number column 1108 and a Service Set Identifier (SSID), or network name, column 1110. The entries in table 1100 correspond to the BS information from FIGS. 7A, 7B, and 10.

Since the coverage and network topologies of the 3G network 410 (or the WiMAX network 420) may be different, a 3G BS (or a WiMAX BS) may match to multiple Wi-Fi access points, and vice versa. For example, the 3G base station with SID=1, NID=2, and PZID=2222 matches two records having Ch=6 and SSID="Office" for Wi-Fi with different WiMAX BSs. Multiple matches indicate that one BS provides coverage via one RAT that overlaps multiple portions of coverage areas provided by multiple BSs using another RAT.

Again, some rows may have empty entries in one of the sections 902, 904, 1106 indicating that network service via one or more RATs is missing from a coverage area provided by another RAT. For example, the 3G BS with SID=1, NID=4, and PZID=444 in FIGS. 7A and 7B provides 3G coverage for a particular area, but there is no Wi-Fi coverage area 1032 within this 3G coverage area. Therefore, the corresponding record (i.e., the last row of the table 1100) within the Wi-Fi section 1106 may be empty or may include values indicating that there is no Wi-Fi network service available in this area.

Exemplary Assisted Acquisition using GPS Coordinates

Another way to assist acquisition of one or more network systems providing service via various RATs is to use the location of the multi-mode MS 700 and compare this to a concurrent service acquisition database whose records match BS information for various RATs to latitude and longitude coordinates. By utilizing location-determination technologies, such as Global Positioning System (GPS), and a concurrent service acquisition database, the multi-mode MS may determine which base stations are available depending on the mobile station's current location. For some embodiments, the multi-mode MS may include a GPS receiver in an effort to determine location. For other embodiments, the multi-mode MS may receive positional coordinates from another device (e.g., a laptop computer, a navigation system in a vehicle, or a handheld GPS) capable of communicating its coordinates to the MS.

Figure 12:
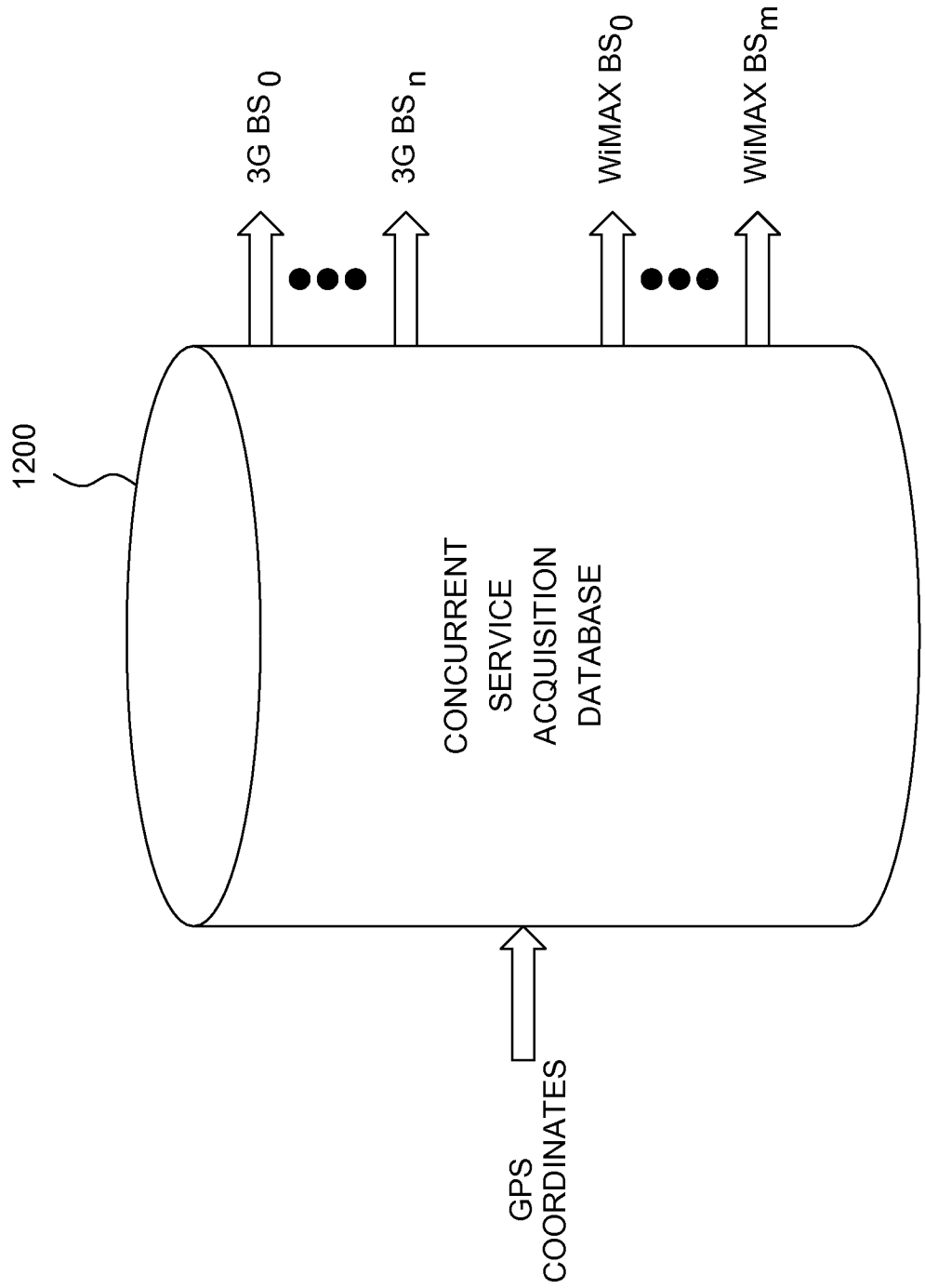
FIG. 12 illustrates a concurrent service acquisition database that may be accessed to obtain information about at least one base station (BS) providing network service via a particular RAT by knowing the Global Positioning System (GPS) coordinates of a multi-mode MS, in accordance with certain embodiments of the present disclosure.

FIG. 12 illustrates a concurrent service acquisition database 1200 that may be accessed to obtain information about at least one BS providing network service via a particular RAT by knowing the GPS coordinates of the multi-mode MS 700. For example, GPS coordinates for the current location of the multi-mode MS may be input to the database 1200 in an effort to find concurrent service acquisition records with information concerning one or more WiMAX base stations ($BS_{0 \ldots n}$) and/or one or more 3G base stations ($BS_{0 \ldots m}$) that may provide network service at or near the current location. The concurrent service acquisition records in the database 1200 may be provided to the multi-mode MS by the network service provider or device manufacturer, may be transmitted to the multi-mode MS by the network during device activation or subsequent operation, or may be learned by the multi-mode MS during normal operations.

Figure 13:
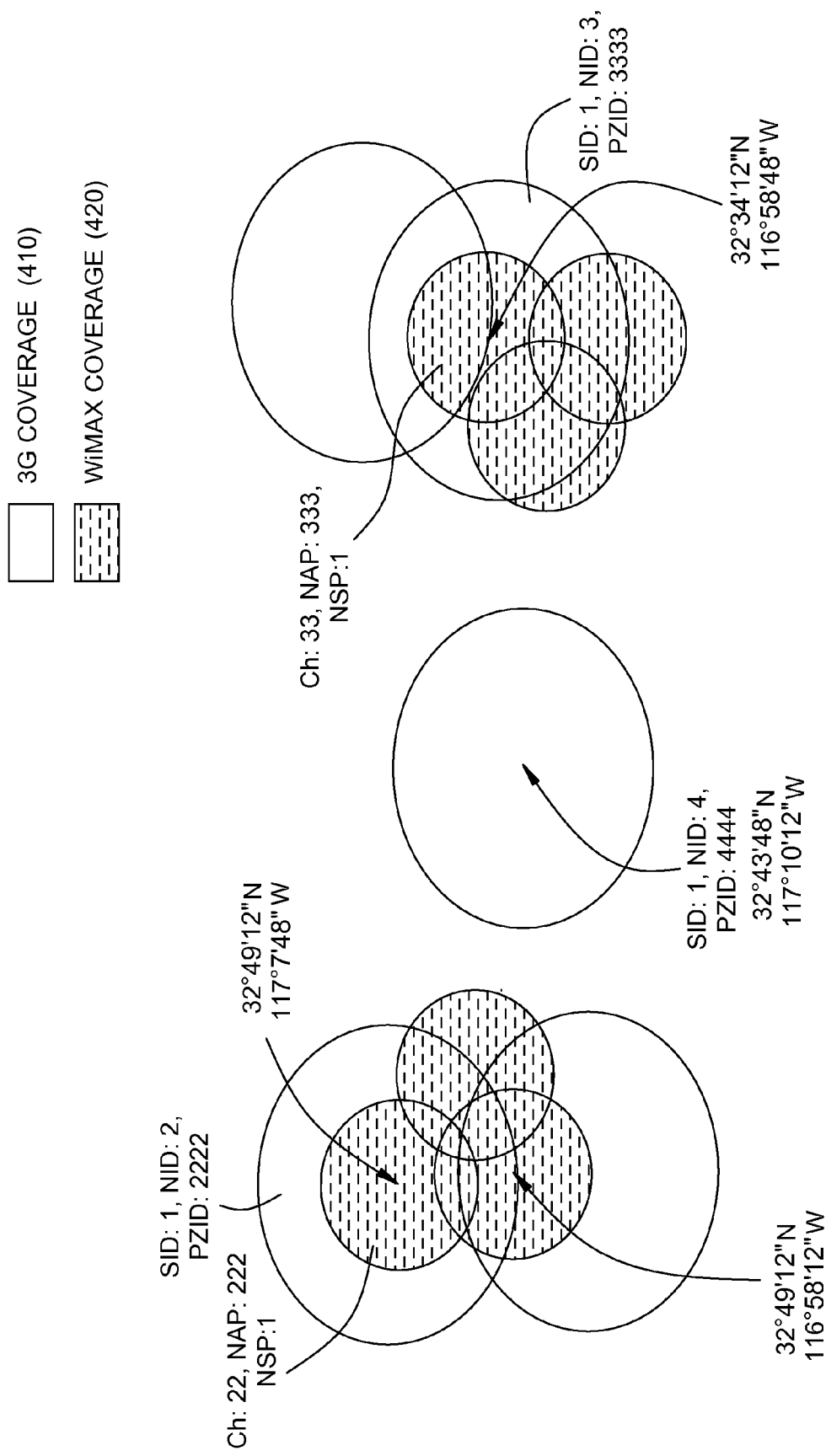
FIG. 13 illustrates the network topology of FIGS. 7A and 7B with GPS coordinates for some of the base stations providing network service, in accordance with certain embodiments of the present disclosure.

FIG. 13 illustrates the network topology of FIGS. 7A and 7B with location coordinates for some of the base stations providing network service. For example, the 3G BS having a SID=1, a NID=4, and a PZID=4444 may be located at 32°43'48" N and 117°10'12" W in San Diego, Calif. For some embodiments, the coordinates of the base stations may be known precisely, while for other embodiments, the coordinates of the base stations may be determined by a commercial-grade GPS device, which has an uncertainty ranging from about 3 m to 100 m depending on the device used. The example coordinates provided in the present disclosure are for illustrative purposes and may not accurately reflect practical distances between neighboring base stations, especially in situations where an overlap in network coverage is achieved.

Figure 14:
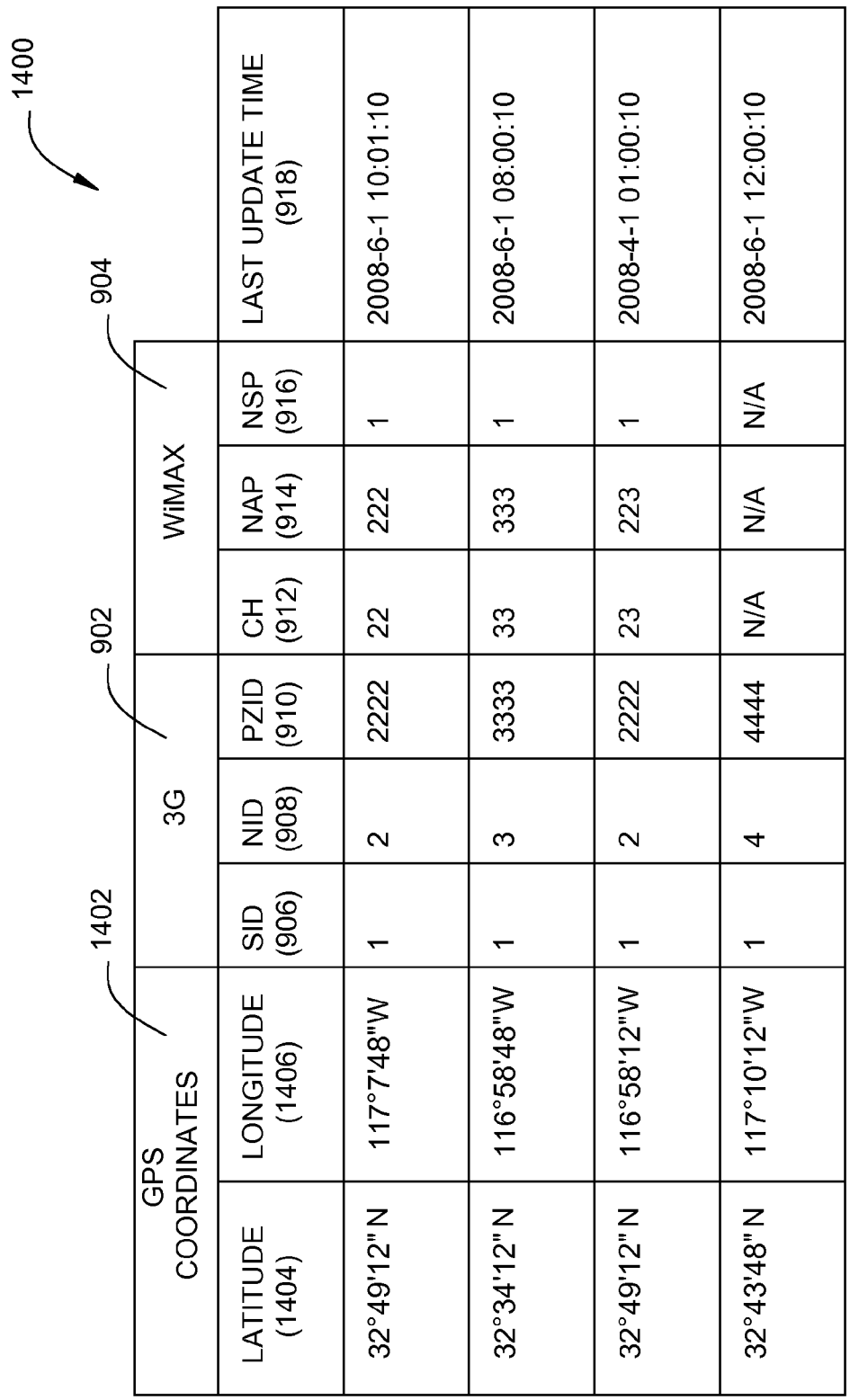
FIG. 14 adds GPS coordinates to the table of BS information pairs of FIG. 9 as another means of determining BS information and assisting system acquisition, in accordance with certain embodiments of the present disclosure.

FIG. 14 illustrates an example table 1400 that adds a GPS coordinates section 1402 to the table 900 of BS information pairs of FIG. 9 as another means of determining BS information and assisting system acquisition. The GPS coordinates section 1402 may include a latitude column 1404 and a longitude column 1406 providing the latitude and longitude, respectively, of one of the base stations in the record or of an area covered by one or both of these base stations. By knowing its current location, the multi-mode MS 700 may access the concurrent service acquisition database 1200 with records having information similar to rows in table 1400. The MS 700 may select one or more concurrent service acquisition records having GPS coordinates close to its current location. Logic on the multi-mode MS may perform this selection using a distance-calculating algorithm, for example, and choosing the closest n base stations, where n is a predetermined integer, or picking all of the base stations closer than a certain threshold distance. By having the BS information readily available in the database 1400, the multi-mode MS may quickly acquire a BS for network service, whether for initial registration or session restoration.

Figure 6A:
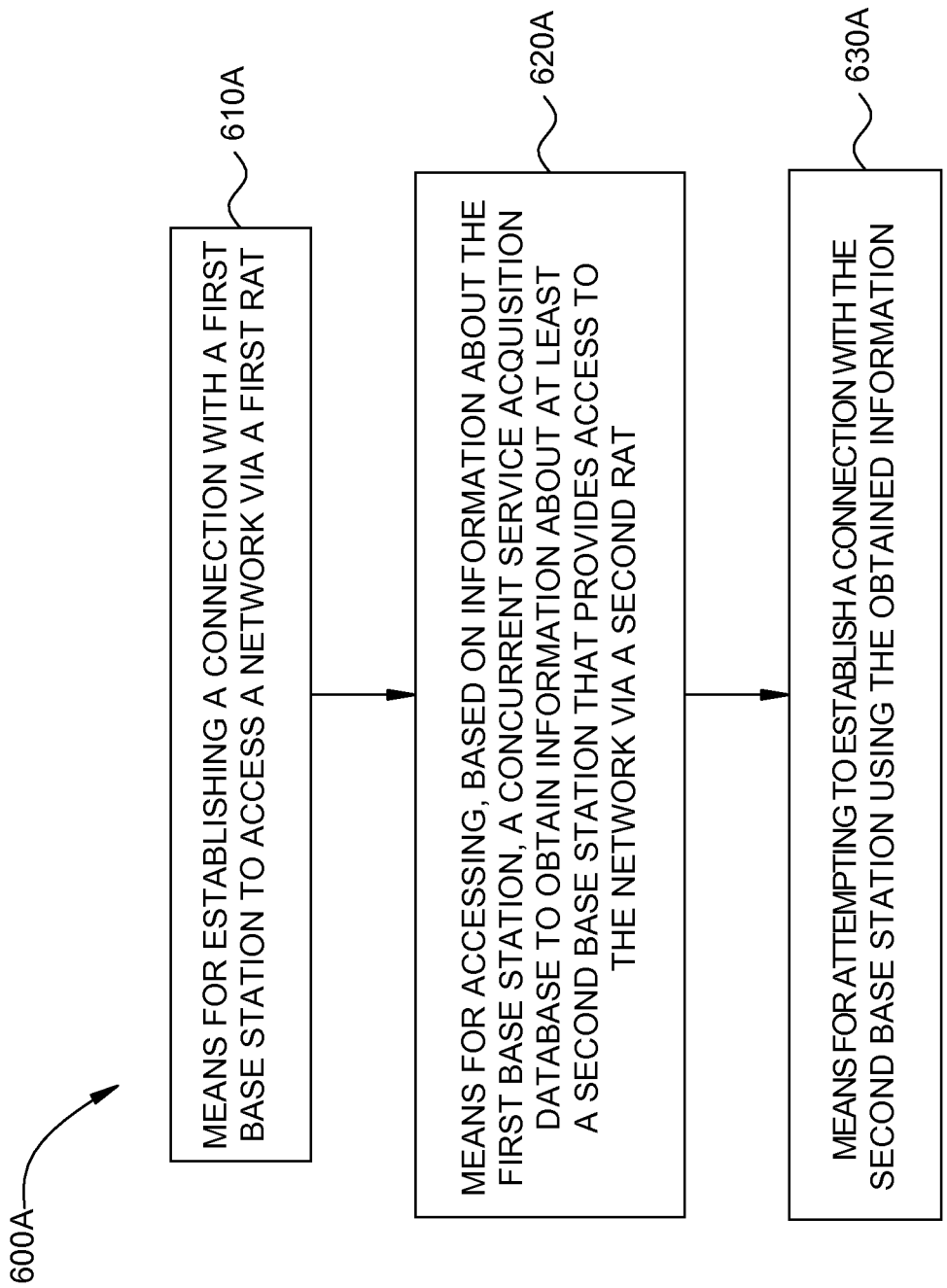
FIG. 6A is a block diagram of means corresponding to the example operations of FIG. 6 for utilizing a concurrent service acquisition database in an effort to establish connections with two BSs such that concurrent network service via first and second RATs may be provided to a multi-mode MS, in accordance with certain embodiments of the present disclosure.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, blocks 610-630 illustrated in FIG. 6 correspond to means-plus-function blocks 610A-630A illustrated in FIG. 6A, and blocks 802-824 illustrated in FIGS. 8A and 8B correspond to means-plus-function blocks 802A-824A illustrated in FIGS. 8C and 8D.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by one or more processors, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for accessing a network with a multi-mode mobile station (MS) capable of communicating via first and second radio access technologies (RATs), comprising:
    establishing a connection with a first base station to access the network via the first RAT;
    accessing a record of a concurrent service acquisition database, based on information about the first base station, to obtain information about a second base station that provides access to the network via the second RAT, wherein the record indicates concurrent service provided by the first base station and the second base station;
    attempting to establish a connection with the second base station using the obtained information, while maintaining the connection with the first base station; and
    concurrently accessing the network via the first RAT and the second RAT,
    wherein the information about the second base station in the concurrent service acquisition database was obtained based at least in part on a scan for an unknown base station providing network service via the second RAT, and added to the concurrent service acquisition database with the information about the first base station.

2. The method of claim 1, wherein the information about the first base station comprises Global Positioning System (GPS) coordinates of the first base station, of the second base station, or of a location covered by network service provided by the first and second base stations.

3. The method of claim 2, wherein the second RAT comprises a WiMAX (Worldwide Interoperability for Microwave Access)-compliant RAT.

4. The method of claim 1, wherein the accessing the concurrent service acquisition database comprises examining a time stamp in the record indicating the last time the record was updated.

5. The method of claim 4, further comprising updating the time stamp to indicate the connection with the second base station was successfully established using the information obtained in the record.

6. The method of claim 1, further comprising:
scanning for the second base station using the obtained information.

7. The method of claim 1, further comprising:
accessing, based on information about the first base station or the second base station, the concurrent service acquisition database to obtain information about a third base station that provides access to the network via a third RAT, wherein the multi-mode MS is capable of communicating via the first, second, and third RATs; and
attempting to establish a connection with the third base station using the obtained information.

8. The method of claim 1, wherein the first RAT comprises a CDMA (Code Division Multiple Access)-based RAT.

9. A non-transitory computer-readable medium for accessing a network with a multi-mode mobile station (MS) capable of communicating via first and second radio access technologies (RATs), the non-transitory computer-readable medium having instructions stored thereon, the instructions being executable by one or more processors and the instructions comprising:
instructions for establishing a connection with a first base station to access the network via the first RAT;
instructions for accessing a record of a concurrent service acquisition database, based on information about the first base station, to obtain information about a second base station that provides access to the network via the second RAT, wherein the record indicates concurrent service provided by the first base station, and the second base station;
instructions for attempting to establish a connection with the second base station using the obtained information, while maintaining the connection with the first base station; and
instructions for concurrently accessing the network via the first RAT and the second RAT,
wherein the information about the second base station in the concurrent service acquisition database was obtained based at least in part on a scan for an unknown base station providing network service via the second RAT, and added to the concurrent service acquisition database with the information about the first base station.

10. The non-transitory computer-readable medium of claim 9, wherein the information about the first base station comprises Global Positioning System (GPS) coordinates of the first base station, of the second base station, or of a location covered by network service provided by the first and second base stations.

11. The non-transitory computer-readable medium of claim 9, wherein the instructions for accessing the concurrent service acquisition database further comprise instructions for examining a time stamp in the record indicating the last time the record was updated.

12. The non-transitory computer-readable medium of claim 11, further comprising instructions for updating the time, stamp to indicate the connection with the second base station was successfully established using the information obtained in the record.

13. The non-transitory computer-readable medium of claim 9, further comprising:
instructions for accessing, based on information about the first base station or the second base station, the concurrent service acquisition database to obtain information about a third base station that provides access to the network via a third RAT, wherein the multi-mode MS is capable of communicating via the first, second, and third RATs; and
instructions for attempting to establish a connection with the third base station using the obtained in formation.

14. The non-transitory computer-readable medium of claim 9, wherein the first RAT comprises a CDMA (Code Division Multiple Access-based RAT.

15. The non-transitory computer-readable medium of claim 14, wherein the second RAT comprises a WiMAX (Worldwide Interoperability for Microwave Access)-compliant RAT.

16. An apparatus for accessing a network, and capable of communicating via first and second radio access technologies (RATs), comprising:
means for establishing a connection with a first base station to access the network via the first RAT;
means for accessing a record of a concurrent service acquisition database, based, on information about the first base station, to obtain information about at least a second base station that provides access to the network via the second RAT, wherein the record indicates concurrent, service provided by the first base station and the second base station;
means for attempting to establish a connection with the second base station using the obtained information, while maintaining the connection with the first base station; and
means for concurrently accessing the network via the first RAT and the second RAT,
wherein the information about the second base station in the concurrent service acquisition database was obtained based at least in part on a scan for an unknown base station providing network service via the second RAT, and added to the concurrent service acquisition database with the information about the first base station.

17. The apparatus of claim 16, wherein the information about the first base station comprises Global Positioning System (GPS) coordinates of the first base station, of the second base station, or of a location covered, by network service provided by the first and second base stations.

18. The apparatus of claim 16, wherein the means for accessing the concurrent service acquisition database further comprises means for examining a time stamp in the record indicating the last time the record was updated.

19. The apparatus of claim 18, further comprising means for updating the time stamp to indicate the connection with the second base station was successfully established using the information obtained in the record.

20. The apparatus of claim 16, further comprising:
means for accessing, based, on information about the first base station or the second base station, the concurrent service acquisition database to obtain information about a third base station that provides access to the network via a third RAT, wherein the apparatus is capable of communicating via the first, second, and third RATs; and
means for attempting to establish a connection with the third base station using the obtained information.

21. The apparatus of claim 16, wherein the first RAT comprises a CDMA (Code Division Multiple Access)-based RAT.

22. The apparatus of claim 21, wherein the second RAT comprises a WiMAX (Worldwide Interoperability for Microwave Access)-compliant RAT.

23. A multi-mode mobile device for accessing a network and capable of communicating via first and second radio access technologies (RATs), comprising:

at least one processor configured to:

establish a connection with a first base station, to access the network via the first RAT;

access a record of a concurrent service acquisition database, based on information about the first base station, to obtain information about a second base station that provides access to the network via the second RAT, wherein the record indicates concurrent service provided by the first base station and the second base station;

attempt to establish a connection with the second base station using the obtained information, while maintaining the connection with the first base station; and concurrently access the network via the first RAT and the second RAT, wherein the information about the second base station in the concurrent service acquisition database was obtained based at least in part on a scan for an unknown base station providing network service via the second RAT, and added to the concurrent service acquisition database with the information about the first base station; and a memory coupled to the at least one processor.

24. The mobile device of claim 23, wherein the information about the first base station comprises Global Positioning System (GPS) coordinates of the first base station, of the second base station, or of a location covered by network service provided by the first and second base stations.

25. The mobile device of claim 23, wherein the at least one processor is further configured to examine a time stamp in the record indicating the last time the record was updated.

26. The mobile device of claim 25, wherein the at least one processor is further configured to update the time stamp to indicate the connection with the second base station was successfully established using the information obtained in the record.

27. The mobile device of claim 23, wherein the at least one processor is further configured to access, based on information about the first base station or the second base station, the concurrent service acquisition database to obtain information about a third base station that provides access to the network via a third RAT;

wherein the multi-mode mobile device is capable of communicating via the first, second, and third RATs; and wherein the at least one processor is further configured to attempt to establish a connection with the third base station using the obtained information about the at least the third base station.

28. The mobile device of claim 23, wherein the first RAT comprises a CDMA (Code Division Multiple Access)-based RAT.

29. The mobile device of claim 28, wherein the second RAT comprises a WiMAX (Worldwide Interoperability for Microwave Access)-compliant RAT.

* * * * *